(12) United States Patent
Onuma et al.

(10) Patent No.: US 10,160,383 B2
(45) Date of Patent: Dec. 25, 2018

(54) SURROUNDINGS MONITORING SYSTEM FOR WORKING MACHINE

(71) Applicant: HITACHI CONSTRUCTION MACHINERY CO., LTD., Tokyo (JP)

(72) Inventors: Chieko Onuma, Tokyo (JP); Ryo Yumiba, Tokyo (JP); Yoshibumi Fukuda, Tokyo (JP); Yukihiro Kawamata, Tsuchiura (JP); Yoichi Kowatari, Tsuchiura (JP); Moritaka Oota, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 73 days.

(21) Appl. No.: 15/124,123

(22) PCT Filed: Mar. 4, 2015

(86) PCT No.: PCT/JP2015/056432
§ 371 (c)(1),
(2) Date: Sep. 7, 2016

(87) PCT Pub. No.: WO2015/163015
PCT Pub. Date: Oct. 29, 2015

(65) Prior Publication Data
US 2017/0018070 A1 Jan. 19, 2017

(30) Foreign Application Priority Data
Apr. 24, 2014 (JP) ................................. 2014-090679

(51) Int. Cl.
*G06K 9/00* (2006.01)
*B60R 1/00* (2006.01)
(Continued)

(52) U.S. Cl.
CPC ................. *B60R 1/002* (2013.01); *B60R 1/00* (2013.01); *B60R 11/04* (2013.01); *E02F 9/24* (2013.01);
(Continued)

(58) Field of Classification Search
None
See application file for complete search history.

(56) References Cited

U.S. PATENT DOCUMENTS 9,834,216 B2 * 12/2017 Pawlicki .............. B60W 30/18
2004/0217260 A1 * 11/2004 Bernardini ......... G01B 11/2504
250/208.1
(Continued)

FOREIGN PATENT DOCUMENTS

CN 103098112 A 5/2013
CN 103544487 A 1/2014
(Continued)

OTHER PUBLICATIONS

Gamba et al. ("A Fast Algorithm for Target Shadow Removal in Monocular Colour Sequences", 1997).*
(Continued)

*Primary Examiner* — Avinash Yentrapati
(74) *Attorney, Agent, or Firm* — Mattingly & Malur, PC

(57) ABSTRACT

A surroundings monitoring system for a working machine prevents its own vehicle shadow from having an influence on the detection of an object existing around the working machine. The surroundings monitoring system for a working machine includes: a monocular camera picks up an image of the surroundings of the working machine. A characteristic pattern extraction unit extracts characteristic patterns in the picked-up image based on a characteristic amount of the image. A shadow profile extraction unit extracts a profile of a region, which can be regarded as a shadow of the working
(Continued)

machine in the image, based on the characteristic amount of the image; and an object detection unit detects an obstacle existing around the working machine based on the remaining characteristic patterns obtained by excluding a shadow profile characteristic patterns positioned on the profile extracted by the shadow profile extraction unit from the characteristic patterns.

3 Claims, 28 Drawing Sheets

(51) Int. Cl.
*B60R 11/04* (2006.01)
*G06K 9/46* (2006.01)
*H04N 7/18* (2006.01)
*E02F 9/26* (2006.01)
*G08G 1/16* (2006.01)
*E02F 9/24* (2006.01)
*G06T 7/11* (2017.01)
*G06T 7/194* (2017.01)

(52) U.S. Cl.
CPC .......... *E02F 9/261* (2013.01); *G06K 9/00805* (2013.01); *G06K 9/4604* (2013.01); *G06T 7/11* (2017.01); *G06T 7/194* (2017.01); *G08G 1/165* (2013.01); *G08G 1/166* (2013.01); *H04N 7/181* (2013.01); *B60R 2300/30* (2013.01); *B60R 2300/607* (2013.01); *B60R 2300/802* (2013.01); *B60R 2300/8093* (2013.01); *G06T 2207/30261* (2013.01)

(56) References Cited

U.S. PATENT DOCUMENTS

| 2006/0184297 | A1* | 8/2006 | Higgins-Luthman ..... B60R 1/00 701/41 |
| 2009/0309710 | A1* | 12/2009 | Kakinami .............. B60Q 9/004 340/435 |
| 2011/0234761 | A1* | 9/2011 | Yumiba ..................... B60R 1/00 348/46 |
| 2013/0141581 | A1 | 6/2013 | Mitsuta et al. |
| 2015/0063647 | A1* | 3/2015 | Ryu ................... G06K 9/00805 382/104 |

FOREIGN PATENT DOCUMENTS

| JP | 2007-272292 A | 10/2007 |
| JP | 2008-165765 A | 7/2008 |
| JP | 2011-209896 A | 10/2011 |
| WO | 2013/175649 A1 | 11/2013 |

OTHER PUBLICATIONS

Hitoshi Saji et al., "Eisei Gazo o mochiita Dora Konzatsu Jokyo no Kaiseki", Image Lab, Dec. 10, 2012, p. 13-17, vol. 23, No. 12.
International Search Report of PCT/JP2015/056432 dated Apr. 14, 2015.
International Preliminary Report on Patentability received in corresponding International Application No. PCT/JP2015/056432 dated Nov. 3, 2016.
Chinese Office Action received in corresponding Chinese Application No. 201580011783.6 dated Apr. 16, 2018.

* cited by examiner

SURROUNDINGS MONITORING SYSTEM FOR WORKING MACHINE

TECHNICAL FIELD

The present invention relates to a surroundings monitoring system for a working machine, the system for monitoring an obstacle existing around the working machine by utilizing a monocular camera image.

BACKGROUND ART

As a background art of the present technical field, JP-2007-272292-A (Patent Document 1) is available. In this document, a shadow boundary extraction method is disclosed in which a pattern indicative of a relationship between pixel values of edge pixels belonging to an edge of an image pickup target in an image picked up by an image pickup apparatus and a plurality of pixels existing in the proximity of the edge pixels is calculated first. Then, a shadow boundary pattern in which a relationship between pixel values of shadow boundary pixels belonging to a shadow boundary between a shadow region and a non-shadow region in the image and a plurality of pixels existing in the proximity of the shadow boundary pixels is referred to, and the shadow boundary pattern and the calculated pattern are compared with each other. Then, the edge pixels belonging to the calculated pattern that coincides with the shadow boundary pattern are decided as pixels existing on the shadow boundary.

PRIOR ART DOCUMENT

Patent Document

Patent Document 1: JP-2007-272292-A

SUMMARY OF THE INVENTION

Problems to be Solved by the Invention

A profile shape of a working machine that includes a dump truck and a hydraulic excavator and is a target of application of the present invention is complicated in comparison with that of a passenger vehicle. Therefore, a shadow of the working machine (hereinafter referred to sometime as own vehicle shadow) projected on the ground surface naturally has a complicated shape. Further, since it is a prerequisite that the working machine travels off-road, the own vehicle shadow of the working machine has a shape complicated in comparison with that of a passenger vehicle whose own vehicle shadow is frequently projected on a paved road. In addition, when the working machine travels off-road, the shape of the own vehicle shadow dynamically varies in response to unevenness of the earth's surface, and therefore, also it can be pointed out that the shape of the own vehicle shadow varies over time.

Therefore, if a method wherein a plurality of boundary patterns of shadows (shadow boundary patterns) appearing on the ground surface are prepared in advance is adopted as in the technology of the document mentioned above, then countless shadow boundary patterns are prepared in accordance with profiles and road surface shapes of the working machine and stored into a storage apparatus such as a memory. However, creation of shadow boundary patterns in accordance with every road surface shape is actually impossible. Further, even if this were possible, it is necessary to prepare a storage apparatus such as a memory that can store a very great amount of data. Therefore, the technology described is not realistic also from the point of view of the initial cost. Further, since it is predicted that a large amount of processing is required for comparison between the countless shadow patterns and a calculated pattern, the technology is not realistic also from the point of view of contents of processing.

In this manner, with the technology of the document mentioned above, recognition of an own vehicle shadow of a working machine in a picked up image is difficult. If accurate recognition of an own vehicle shadow cannot be performed, then the own vehicle shadow may be recognized in error, for example, as an object (obstacle) existing around the working machine and a warning that is not required originally may be issued, resulting in decrease in work efficiency.

Further, in order to develop a surroundings monitoring system of a working machine, also it is necessary to take such special circumstances as described below into consideration. In particular, since a working machine is huge and has a great height in comparison with general passenger vehicles, there is a tendency that a camera (image pickup apparatus) for monitoring the surroundings is installed at a high position. Then, if it is tried to pick up an image of the surroundings of the working machine, then the camera is postured so as to face substantially downwardly of the working machine (in other words, the depression angle of the camera becomes great). Naturally, although it depends upon the position of the sun, an own vehicle shadow appears not less frequently in a picked up image. Therefore, in order to allow the surroundings monitoring system to function, it is essentially required to detect an object in the own vehicle shadow. Further, where a black object exists on a profile of the own vehicle shadow, there is the possibility that the object may be regarded as part of the own vehicle shadow and may be detected too late. This problem of the own vehicle shadow unique to a working machine of the type described appears more prominently as the size of the construction machine increases like a huge dump track (mine dump) used in the mines.

It is an object of the present invention to provide a surroundings monitoring system for a working machine in which, even if an image obtained by imaging surroundings of the working machine includes an own vehicle shadow of a complicated shape, it can be prevented that the presence of the own vehicle shadow has an influence on detection of an object existing around the working machine.

Means for Solving the Problem

To achieve the object described above, according to the present invention, there is provided a surroundings monitoring system for a working machine, including a monocular camera incorporated in the working machine and configured to pick up an image of the surroundings of the working machine, a characteristic pattern extraction unit configured to extract characteristic patterns in the image based on a characteristic amount of the image, a shadow profile extraction unit configured to extract a profile of a region, which can be regarded as a shadow of the working machine in the image, based on the characteristic amount of the image, and an object detection unit configured to detect an obstacle existing around the working machine based on remaining characteristic patterns obtained by excluding characteristic patterns positioned on the profile extracted by the shadow profile extraction unit from the characteristic patterns extracted by the characteristic pattern extraction unit.

Effect of the Invention

With the present invention, even if an image obtained by imaging surroundings of the working machine includes an own vehicle shadow of a complicated shape that varies over time, the portion regarded as the profile of the own vehicle shadow is excluded appropriately from the obstacle detection target. Therefore, prevention of false recognition of the own vehicle shadow and improvement of the obstacle detection accuracy can be anticipated.

MODE FOR CARRYING OUT THE INVENTION

Figure 1:
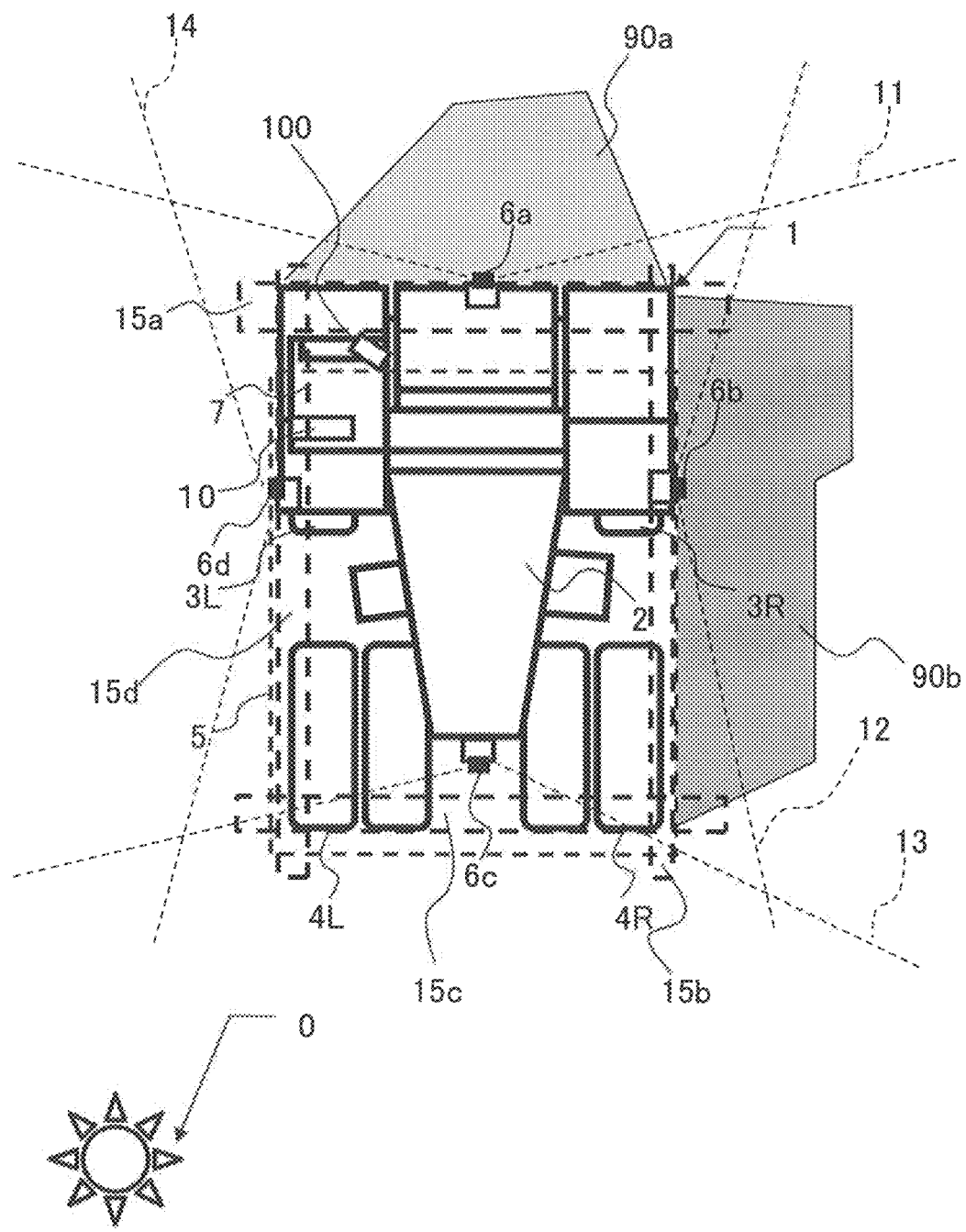
FIG. 1 is a top plan view of a dump track according to an embodiment.

Before an embodiment of the present invention is described, principal features included in a surroundings monitoring system for a working machine according to the embodiment of the present invention are described.

A surroundings monitoring system for a working machine according to an embodiment hereinafter described includes a monocular camera (for example, a camera 6 hereinafter described) incorporated in the working machine and configured to pick up an image of the surroundings of the working machine, a characteristic pattern extraction unit (for example, a characteristic pattern extraction unit 170 hereinafter described) configured to extract characteristic patterns (for example, corners or edges in the image) in the image based on a characteristic amount of the image, a shadow profile extraction unit (for example, a shadow profile extraction unit 40 hereinafter described) configured to extract a profile of a region, which can be regarded as a shadow of the working machine in the image, based on the characteristic amount of the image, and an object detection unit (for example, an object detection unit 180 hereinafter described) configured to detect an obstacle existing around the working machine based on the remaining characteristic pattern obtained by excluding a characteristic pattern positioned on a profile extracted by the shadow profile extraction unit from the characteristic patterns extracted by the characteristic pattern extraction unit.

In the surroundings monitoring system configured in this manner, irrespective of the complexity of the shape of the shadow (own vehicle shadow) of the working machine, the profile of the shadow (shadow profile) is extracted after every sampling interval, and a characteristic pattern positioned on the shadow profile is excluded from the obstacle detection target. Therefore, the own vehicle shadow can be prevented from being recognized as an obstacle in error. Further, since a characteristic pattern that does not exist on the shadow profile still remains as the obstacle detection target by the object detection unit, even if, for example, an obstacle such as an automobile exists on the shadow profile and a characteristic pattern that exists on the shadow profile from among the characteristic patterns relating to the obstacle is removed, the remaining characteristic pattern (for example, the characteristic pattern existing in the inside of the own vehicle shadow) still remains as the obstacle detection target. Therefore, if obstacle detection is performed on the basis of the remaining characteristic pattern, then the obstacle can be detected immediately.

It is to be noted that, in the surroundings monitoring system described above, where a black obstacle (for example, a passenger vehicle of the black) exists over the inside and the outside of the own vehicle shadow of the working machine on a profile of the own vehicle shadow, a profile of the black obstacle is sometimes regarded as a shadow profile. However, also in this case, since a characteristic pattern originating from the obstacle remains on the inside and the outside of own vehicle shadow, it is possible to detect the obstacle on the basis of the remaining characteristic pattern. In other words, with the configuration of the surroundings monitoring system, there is no necessity to accurately recognize the shadow boundary of the working machine, and also when the shadow boundary is recognized in error, detection of the obstacle can be performed rapidly.

Accordingly, with the present embodiment, even if the own vehicle shadow of the complicated shape that varies over time exists in an image obtained by imaging the surroundings of the working machine, since a portion regarded as a profile of the own vehicle shadow is excluded appropriately from the obstacle detection target, prevention of recognition of the own vehicle shadow in error and improvement of the obstacle detection accuracy can be anticipated.

Incidentally, where a working machine is utilized in the mines, generally a color originating from minerals (for example, at an iron ore mining site, reddish brown unique to the iron ore) sometimes appears on the earth's surface. Therefore, if a color in an image is selected as a characteristic amount where an own vehicle shadow is to be extracted from a picked up image of the monocular camera, then the possibility that the extraction performance of an own vehicle shadow and a shadow profile may degrade increases. Further, since the color is varied also by a change of light, also from this point of view, it is not appropriate to select the color as the characteristic amount. In contrast, in the present invention, since a color of an image is not used as a characteristic amount when an own vehicle shadow is to be extracted, the detection of an obstacle around the working machine is not hindered. Further, the present invention has a merit also in that it is possible to detect an object existing around the working machine from a single image (still picture) picked up by the monocular camera.

It is to be noted that the "characteristic pattern" described above represents a shape of a characteristic of an image detected by extracting the characteristic on the basis of a characteristic amount, and, for example, a point (corner), a line-profile line (edge), a region and so forth are applicable as the characteristic pattern.

In the following, an example of a surroundings monitoring system for a working machine to which the present invention is applied is described with reference to the drawings. Although an example in which a dump truck is applied as a working machine is described herein, the working machine is not limited only to the dump truck. In short, the present invention can be applied to an arbitrary working machine that performs a predetermined work (transportation, excavation or the like) including a hydraulic excavator.

FIG. 1 depicts a top plan view of a dump truck according to the present embodiment. The dump truck 1 depicted in this figure includes: a vehicle body frame 2; front wheels 3 (3L ad 3R) and rear wheels 4 (4L and 4R) attached for rotation to the vehicle body frame 2; a vessel 5 attached for upward and downward movement above the vehicle body frame 2; monocular cameras 6 (6a, 6b, 6c and 6d) fixed to a chassis, the vehicle body frame 2 or the like; a cab 7 provided at a front upper portion of the vehicle body frame 2; an image processing apparatus 10 incorporated in an arbitrary place (for example, in the inside of the cab 7) on the vehicle body frame 2; and a display apparatus 100 provided in the inside of the cab 7. The vehicle body frame 2 forms a main body of the dump truck 1 and has the front wheels 3 and the rear wheels 4 at front and rear portions thereof. It is to be noted that the front wheel 3R is a front wheel on the right side of the vehicle, and the front wheel 3L is a front wheel on the left side of the vehicle. Further, the rear wheels 4R are two rear wheels on the right side of the vehicle, and the rear wheels 4L are two rear wheels on the left side of the vehicle. The vessel 5 is a so-called loading platform and is utilized to load sediment, mineral or the like. It is to be noted that the arrangement and the number of the front wheels 3 and the rear wheels 4 depicted are a mere example.

The monocular cameras 6 that are image pickup apparatus can be installed at arbitrary positions of the dump truck 1. In the present embodiment, the totaling four cameras 6a, 6b, 6c and 6d are installed, and the camera 6a is installed in an obliquely downwardly looking down manner at a front upper portion of the dump truck 1 such that it has a visual field range 11 (range of a broken line 11 of FIG. 1) that includes a vehicle front 15a. Similarly, the camera 6b is installed at a right side upper portion of the vehicle such that a visual field range 12 thereof includes a vehicle right side 15b. The camera 6c is installed at a rear upper portion of the vehicle such that a visual field range 13 thereof includes a vehicle rear 15c, and the camera 6d is installed at a left side upper portion of the vehicle such that a visual field range 14 thereof includes a vehicle left side 15d.

In the example of FIG. 1, since the sun 0 is positioned at a left side rear upper location with respect to the dump truck 1, a shadow (own vehicle shadow) of the dump truck 1 appears in a forward region 90a and a rightward region 90b. It is to be noted that, although the shadows 90a and 90b appearing on the front side and the right side of the dump truck 1 are schematically indicated divisionally on the front side and the right side of the dump truck 1 in FIG. 1, actually the two shadows 90a and 90b are continuous to each other (this similarly applies also to the other like figures).

Figure 2:
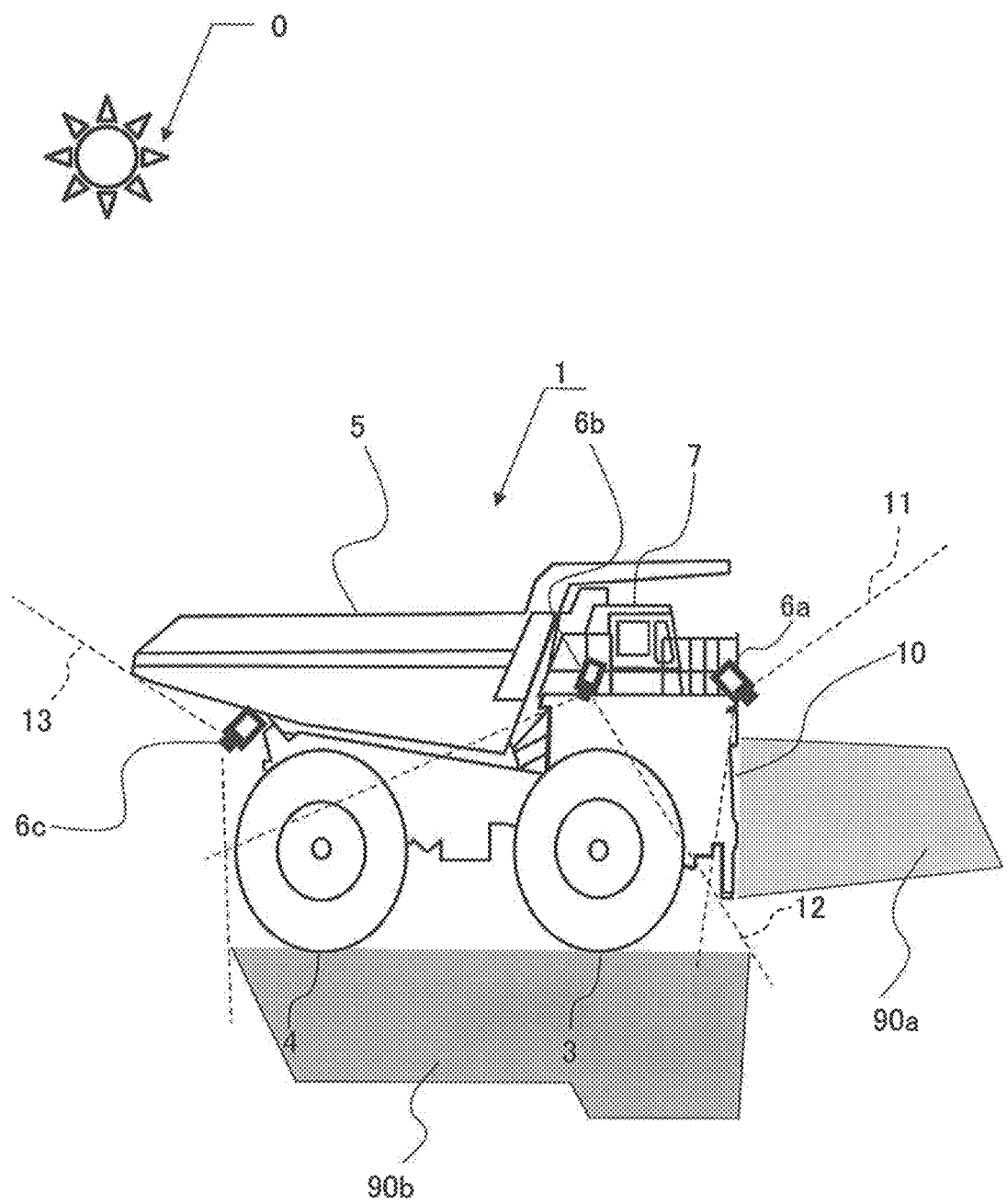
FIG. 2 is a side elevational view of the dump track 1 depicted in FIG. 1.

FIG. 2 depicts a side elevational view of the dump truck 1 depicted in FIG. 1.

The camera 6a having the visual field range 11 (range of a broken line 11 of FIG. 2) is attached at a position obliquely rightwardly forwards as viewed from the cab 7, and the camera 6b having the visual field range 12 (range of a broken line 12 of FIG. 2) is attached at a position obliquely rightwardly rearwards as viewed from the cab 7. Further, the camera 6c having the visual field range 13 (range of a broken line 13 of FIG. 2) is attached to a rear portion of the vehicle body frame 2. Although the camera 6d having the visual field range 12 (not depicted in FIG. 2) is attached to a position obliquely leftwardly rearwards as viewed from the cab 7, this is not depicted in FIG. 2. Videos picked up by the camera 6a, camera 6b, camera 6c and camera 6d are outputted as image data to the image processing apparatus 10.

The cab 7 includes various operation means for operating the dump truck 1 by an operator boarded in the cab 7 including a steering handle, an accelerator pedal and a brake pedal. As another operation means, for example, a shift lever for causing the dump truck 1 to move forwardly or rearwardly is available. The image processing apparatus 10 and the display apparatus 100 are provided in the cab 7, and image data picked up and generated by the cameras 6a, 6b, 6c and 6d are subjected to a predetermined image process by the image processing apparatus 10. The image data for which the image process is performed are displayed on the display apparatus 100. Basically, videos picked up by the cameras 6a, 6b, 6c and 6d are displayed on the display apparatus 100.

Here, in FIG. 2, the forward visual field range 11 is a region at a obliquely forwardly downward location of the dump truck 1. The forward visual field range 11 sometimes includes an operator, a different working machine, a service car or the like. This similarly applies also to the rightward visual field range 12, rearward visual field range 13 and leftward visual field range 14.

Figure 3:
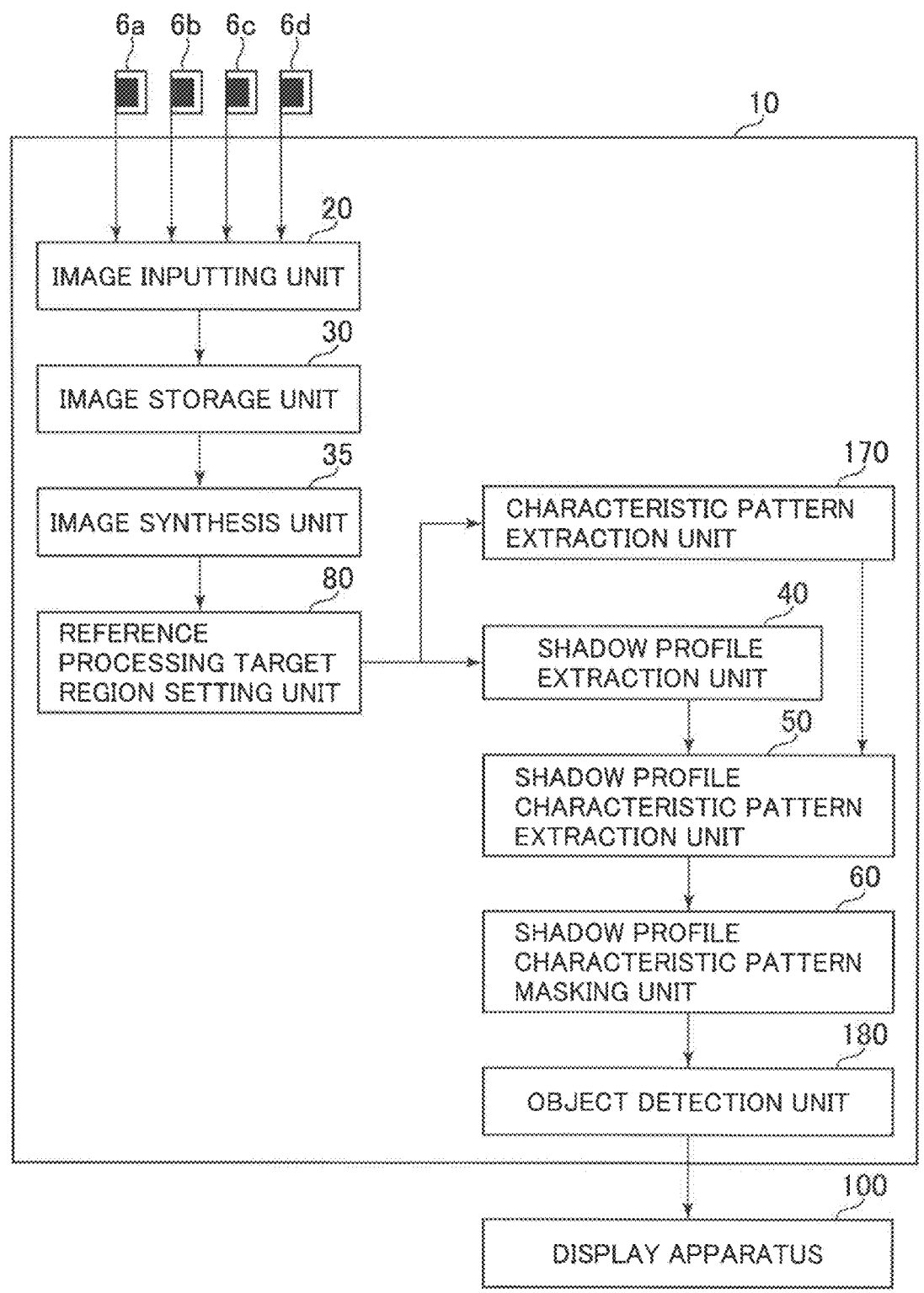
FIG. 3 is a block diagram of a general configuration of an image processing system.

FIG. 3 is a view depicting a general configuration of an image processing apparatus 10 according to a first embodiment of the present invention. The image processing apparatus 10 depicted in FIG. 3 includes an image inputting unit 20, an image storage unit 30, an image synthesis unit 35, a reference processing target region setting unit 80, a characteristic pattern extraction unit 170, a shadow profile extraction unit 40, a shadow profile characteristic pattern extraction unit 50, a shadow profile characteristic pattern masking unit 60 and an object detection unit 180.

Camera images picked up by the four cameras 6a, 6b, 6c and 6d are individually inputted at predetermined sampling intervals to the image inputting unit 20 and stored into the image storage unit 30.

The image storage unit 30 samples and stores input images from the image inputting unit 20 at different intervals from each other. For example, when the dump truck 1 is in a stopping state, the sampling interval is set longer, but when the dump truck 1 is moving, the sampling interval is set shorter, to store the input images. Therefore, image processing may be performed on the basis of required minimum input images, and reduction in time can be anticipated and optimization of processing can be anticipated.

The image synthesis unit 35 synthesizes a plurality of camera images outputted from the four cameras 6a, 6b, 6c and 6d and stored in the image storage unit 30 into one image.

Figure 4:
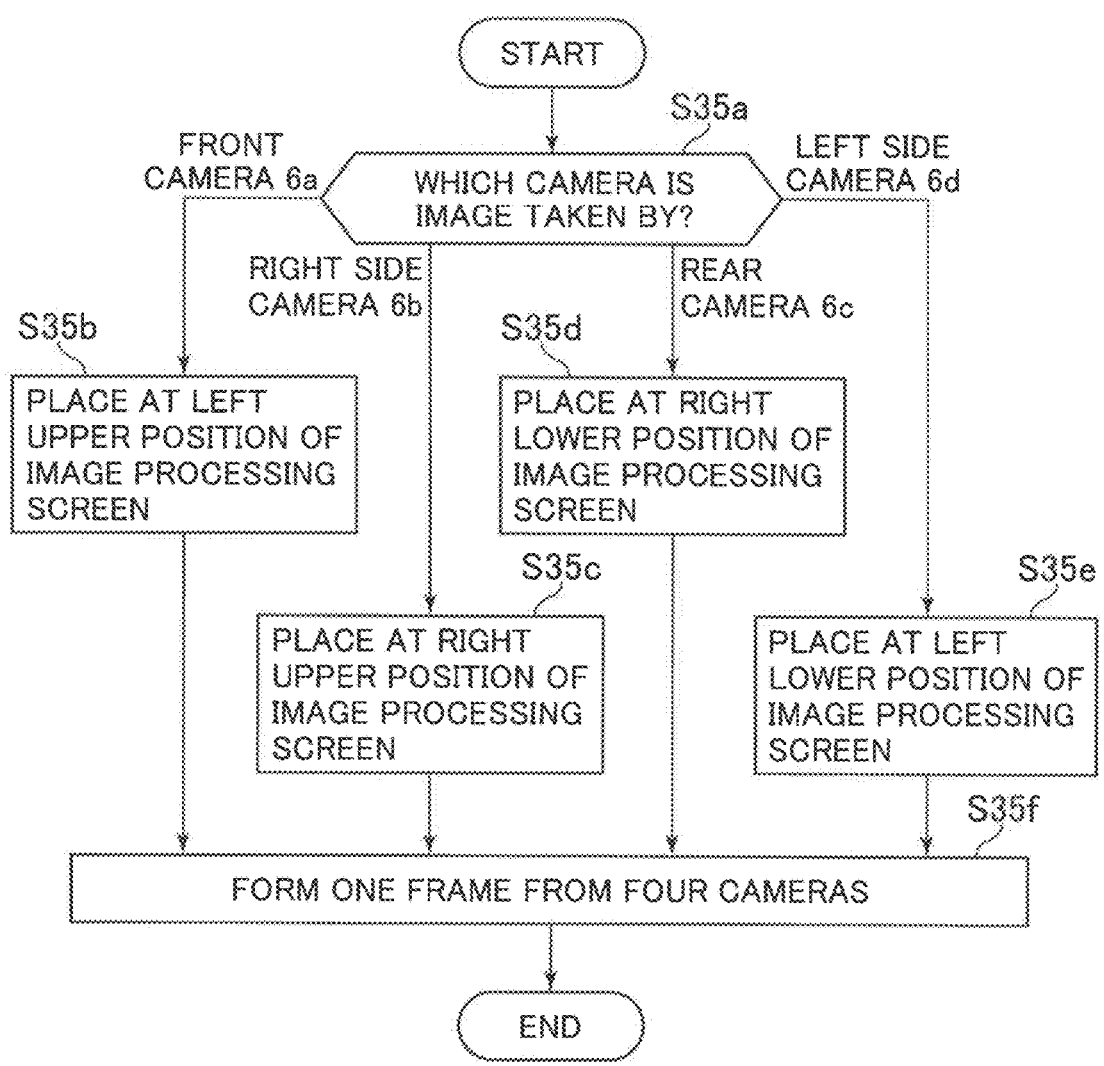
FIG. 4 depicts an example of a processing procedure executed by an image synthesis unit.

An example of a processing procedure executed by the image synthesis unit 35 of the surroundings monitoring system for a working machine of the present invention is depicted in FIG. 4. First at step 35a, the image synthesis unit 35 decides from which one of the four cameras 6a, 6b, 6c and 6d an image originates. If the image originates from the forward camera 6a, then the image synthesis unit 35 performs a process for placing the image into a left upper region of an image processing screen (step 35b). If the image originates from the right side camera 6b, then the image synthesis unit 35 performs a process for placing the image into a right upper region of the image processing screen (step 35c). If the image originates from the rear camera 6c, then the image synthesis unit 35 performs a process for placing the image into a right lower region of the image processing screen (step 35d). If the image originates from the left side camera 6d, then the image synthesis unit 35 performs a process for placing the image into a left lower region of the image processing screen (step 35e). By this procedure, a synthesis image whose one frame is formed from the images of the four cameras 6a, 6b, 6c and 6d is created (step 35f).

Figure 5:
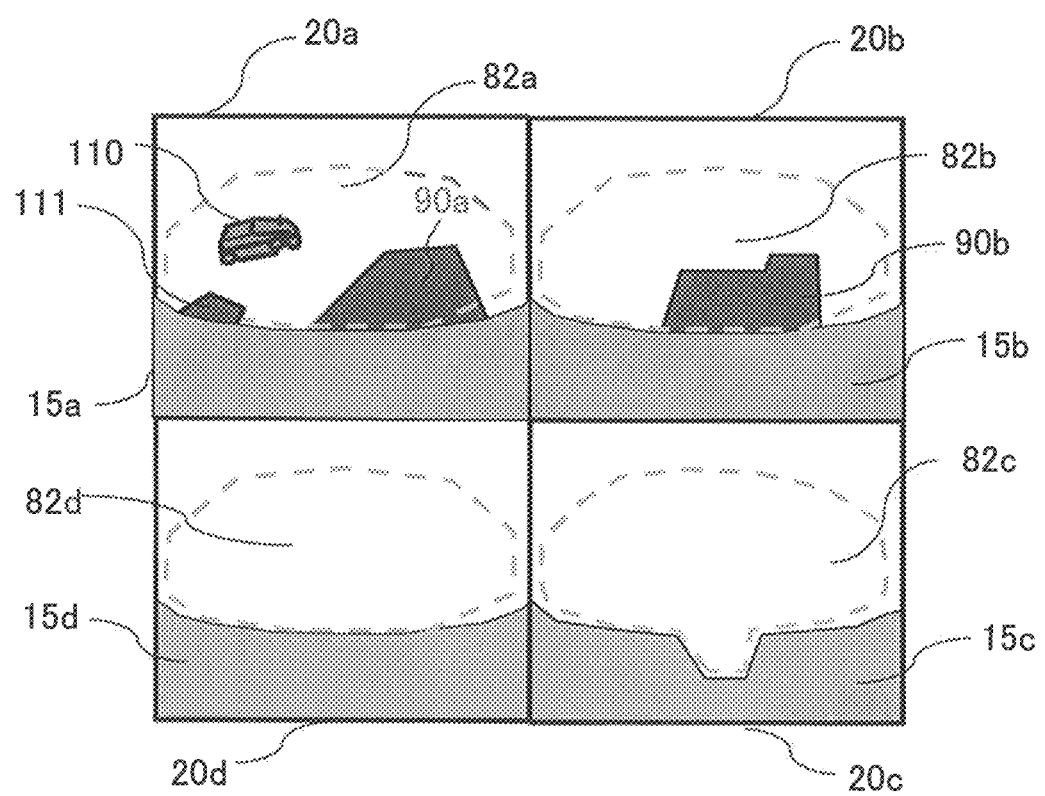
FIG. 5 is a view depicting an example of an image synthesized from input images of four cameras by the image synthesis unit.

An example of an image obtained by synthesizing with use of the image synthesis unit 35 an input image 20a of the camera 6a, an input image 20b of the camera 6b, an input image 20c of the camera 6c and an input image 20d of the camera 6d of the surroundings monitoring system for a working machine of the present invention is depicted in FIG. 5. In FIG. 5, an own vehicle shadow 90a appears in the input image 20a, and another own vehicle shadow 90b appears in the input image 20b. Further, in the input image 20a, a black vehicle 110 and a non-own vehicle shadow 111 exist as dark regions similarly to the own vehicle shadow 90a (for example, if the black vehicle lies below the working machine, then the black vehicle does not make a shadow (own vehicle shadow) of the working machine.

In the present embodiment, if a dark region that contacts with part 15a and 15b of the working machine main body exists and the area of the dark region is equal to or greater than a predetermined value (that is a value that depends upon the magnitude of the working machine and the position of the sun 0), then the dark region is decided as an own vehicle shadow (own vehicle shadows 90a and 90b). On the other hand, if the dark region has an area smaller than the predetermined value, then even if it contacts with part 15a or 15b of the working machine main body, this is decided as the non-own vehicle shadow 111.

The reason why an own vehicle shadow and a non-own vehicle shadow are distinguished from each other in this manner is that, since, when a profile image of a shadow is generated by a shadow profile image creation unit 46 hereinafter described, the shadow profile characteristic pattern masking unit 60 excludes a profile image of a non-own vehicle shadow from a processing target region to make a mask region, it is intended to prevent such a situation that the mask region is expanded to degrade the obstacle detection performance. Further, although a region having an area smaller than the predetermined value is decided as a non-own vehicle shadow 111, since the working machine has a large machine body, also the area of the own vehicle shadow is frequently greater than that of a detection target object (for example, a service car), and it is rare that the area of the own vehicle shadow is smaller than a non-own vehicle shadow.

It is to be noted that, while the example depicted in FIG. 5 is described above as an example in which images of the four cameras 6a, 6b, 6c and 6d are synthesized into one image, this is nothing but one example, and the arrangement of the images in the one image may be different from that depicted in FIG. 5. Further, while, in the example described herein, obstacle detection is performed utilizing camera images of the four cameras, the number of cameras to be utilized for obstacle detection (namely, the number of images to be utilized for obstacle detection) may be any number.

Referring back to FIG. 3, the reference processing target region setting unit 80 is a unit for specifying, on the basis of a processing target region set in advance, a region for which various succeeding processes (for example, including obstacle detection by the object detection unit 180) are to be performed on the images 20a, 20b, 20c and 20d synthesized by the image synthesis unit 35.

Figure 6:
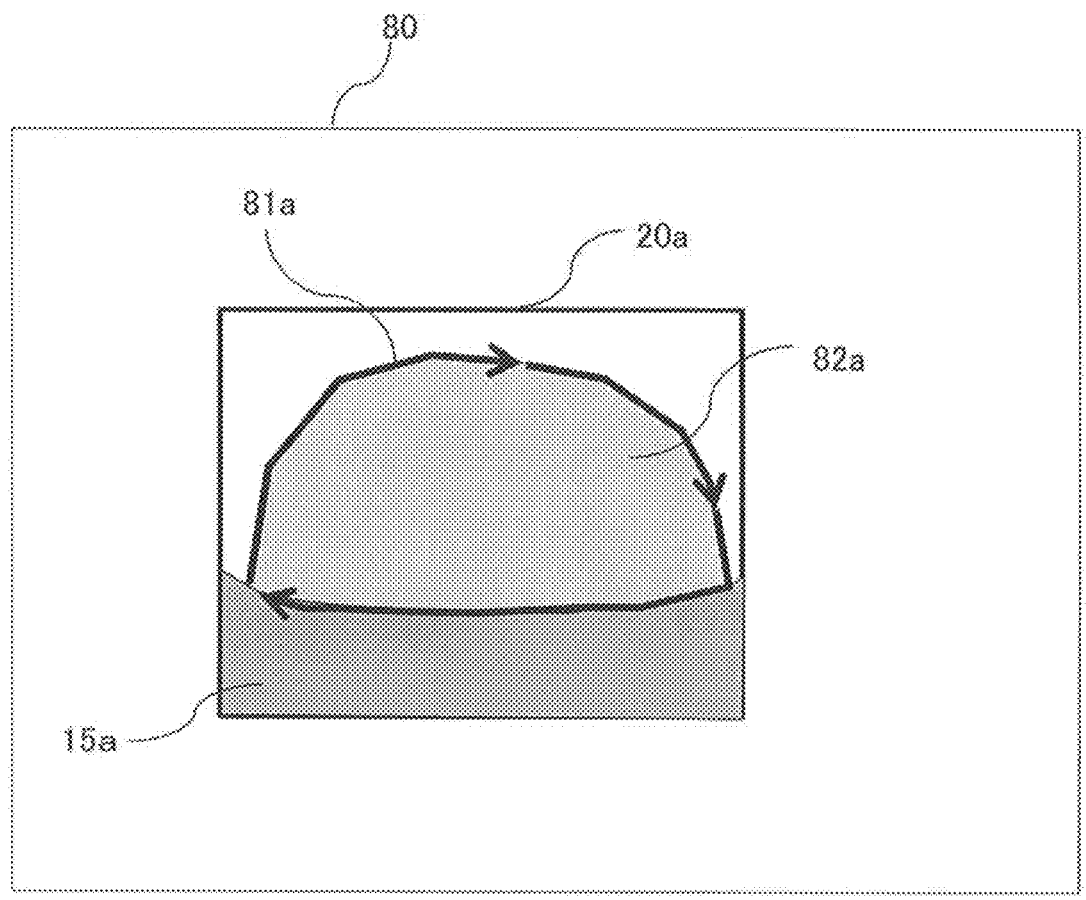
FIG. 6 depicts a setting procedure of a processing target region performed in advance before region specification by a reference processing target region setting unit is performed.

A setting procedure of a processing target region performed in advance before region specification by the reference processing target region setting unit 80 is performed is illustrated in FIG. 6. Here, a case is described in which a processing target region is set for the input image 20a picked up by the camera 6a. If an operator successively indicates reference points on the input image 20a manually with a mouse or the like to designate a closed region 81a in advance, then a processing target region 82a is created on the basis of the closed region 81a.

It is to be noted that, although the case in which the reference processing target region setting unit 80 is set manually is described with reference to FIG. 6, a processing target region may be set automatically by image processing by utilization of profile information or the like or may be set by some other tool (for example, a tool for setting a road surface or the like extracted automatically from an image as a processing target region or a like tool). There is no necessity to restrict a technique specifically if the closed region 82a is created. Further, a processing target region to be set may be, for example, a closed region surrounded so as to include the entire ground or a closed region that surrounds part of the ground. Further, although the processing target region here is set only on the input image 20a, it is a matter of course that a processing target region may be set also on the other images 20b, 20c and 20d.

The shadow profile extraction unit 40 is a unit that extracts a profile (shadow profile) of a region that can be regarded as a shadow of the dump truck 1 in a processing target region determined and set by the reference processing target region setting unit 80 on the basis of characteristic amounts of the image. It is to be noted that the "region that can be regarded as a shadow of the dump truck 1" need not coincide with an actual shadow region of the dump truck 1 but includes also a region that is recognized as a shadow of the dump truck 1 from the relationship of image processing. For example, where a black vehicle exists on the profile of a shadow of the dump truck 1, the profile of the black vehicle is sometimes regarded as a shadow of the dump truck 1. The shadow profile extraction unit 40 performs shadow profile extraction from one frame given as one image synthesized by the image synthesis unit 35.

Figure 7:
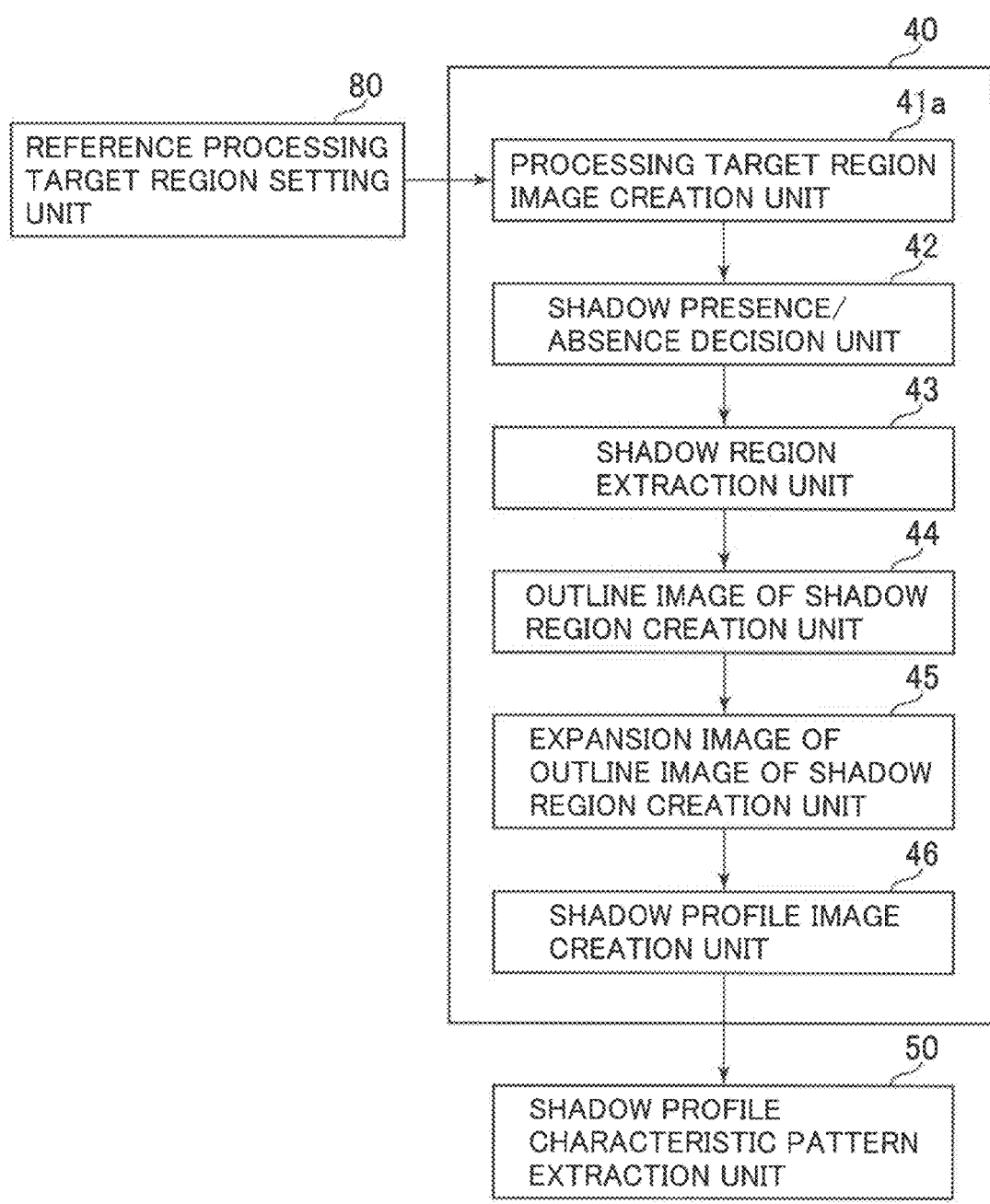
FIG. 7 is a functional block diagram of a shadow profile extraction unit 40.

Here, particular functions provided in the shadow profile extraction unit 40 according to the present embodiment are depicted in FIG. 7. As depicted in FIG. 7, the shadow profile extraction unit 40 functions as a processing target region image creation unit 41, a shadow presence/absence decision unit 42, a shadow region extraction unit 43, an outline image creation unit 44 of a shadow region, an expansion image creation unit 45 and a shadow profile image creation unit 46.

First, the processing target region image creation unit 41a generates, in an image stored in the image storage unit 30, a closed region set as a processing target region by the reference processing target region setting unit 80. Consequently, later processes are performed restrictively to the inside of the closed region.

The shadow presence/absence decision unit 42 decides whether there exists a shadow in a processing target region. If the shadow presence/absence decision unit 42 decides that there exists a shadow, then the shadow region extraction unit 43 extracts a shadow region. Here, details of the shadow presence/absence decision unit 42 are described in detail with reference to FIG. 8.

Figure 8:
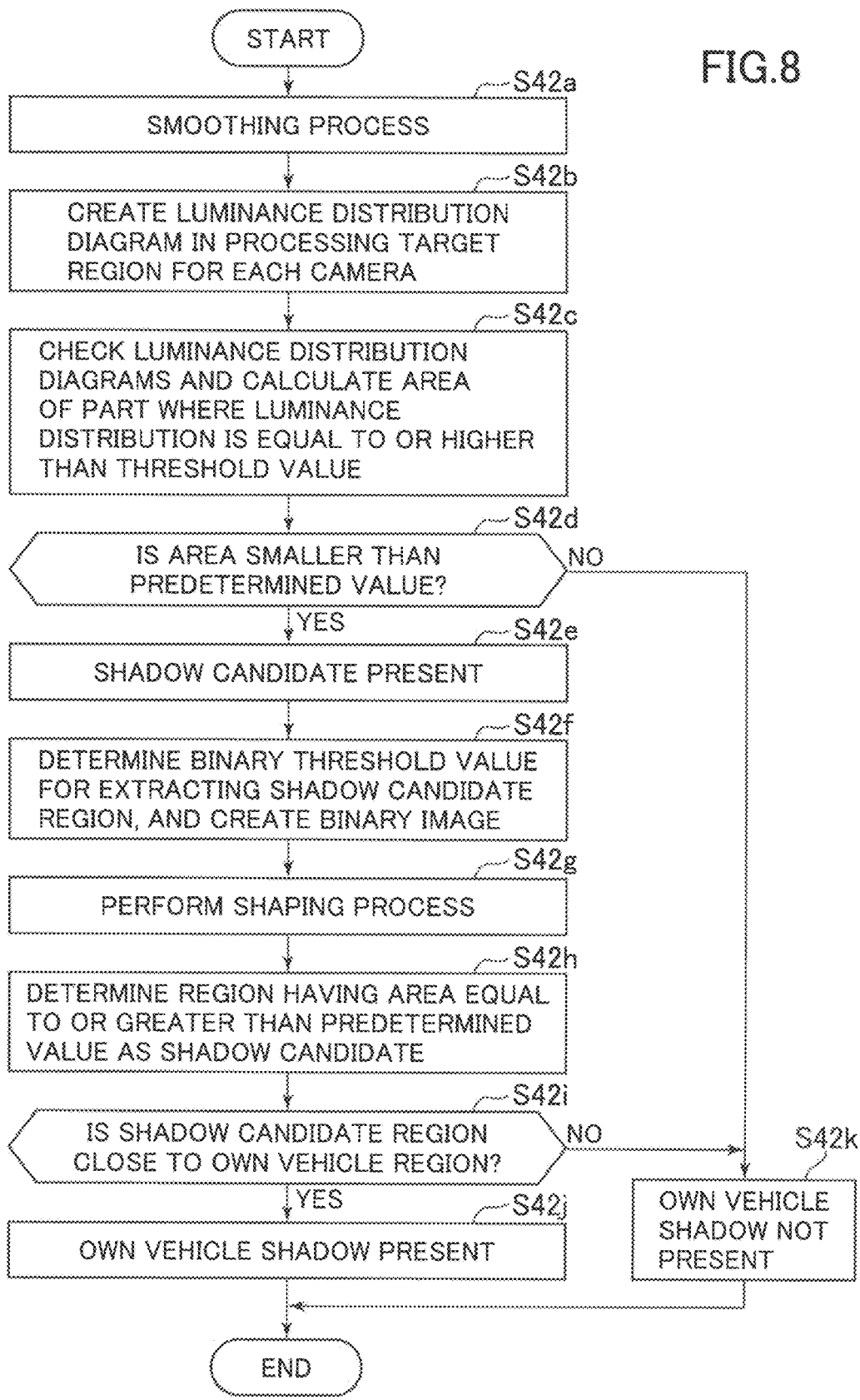
FIG. 8 is a flow chart of processing executed by a shadow presence/absence decision unit 42 and a shadow region extraction unit 43.

FIG. 8 is a flow chart of processing executed by the shadow presence/absence decision unit 42 and the shadow region extraction unit 43 according to the surroundings monitoring system for a working machine of the present invention. First at step 42a, the shadow presence/absence decision unit 42 performs a smoothing process for the processing target region of each of the images 20a, 20b, 20c and 20d to reduce noise. At step 42b, the shadow presence/absence decision unit 42 creates a luminance distribution diagram in the processing target region of each of the images 20a, 20b, 20c and 20d. Then at step 42c, the shadow presence/absence decision unit 42 checks the luminance distribution diagram created at step 42b and calculates the area of a region in which the luminance distribution is equal to or higher than a predetermined threshold value. At step 42d, the shadow presence/absence decision unit 42 decides whether the calculated area is smaller than a predetermined value, and if the calculated area is smaller than the predetermined value (including a case in which the area is zero), the shadow presence/absence decision unit 42 decides that there exists a shadow candidate at step 42e. On the other hand, if it is decided at step 42d that the calculated area is equal to or greater than the predetermined value, then the shadow presence/absence decision unit 42 decides at step 42k that there exists no own vehicle shadow and ends the processing.

At step 42f, the shadow region extraction unit 43 determines a binary threshold value for extracting a shadow candidate region, and at step 42g, the shadow region extraction unit 43 performs a shaping process such as expansion or contraction for the binary image. At step 42h, the shadow region extraction unit 43 determines a region in which the area of a dark portion in the binary image is equal to or greater than a predetermined value as a shadow candidate region. Finally at step 42i, the shadow region extraction unit 43 decides whether the shadow candidate region is close to an own vehicle region. If the shadow candidate region is in the proximity of the own vehicle region, then the shadow region extraction unit 43 decides at step 42j that there exists an own vehicle shadow and extracts the shadow candidate region as a shadow region, thereby ending the processing.

On the other hand, if the shadow candidate region is not close to the own vehicle region at step 42i, then the shadow region extraction unit 43 decides at step 42k that there exists no own vehicle shadow, thereby ending the processing.

It is to be noted that that the shadow candidate region is positioned in the proximity of the own vehicle region at step 42i as described in depiction for FIG. 5 signifies that the dark region 90a that is an own vehicle shadow contacts with part 15a of the working machine main body.

Figure 9:
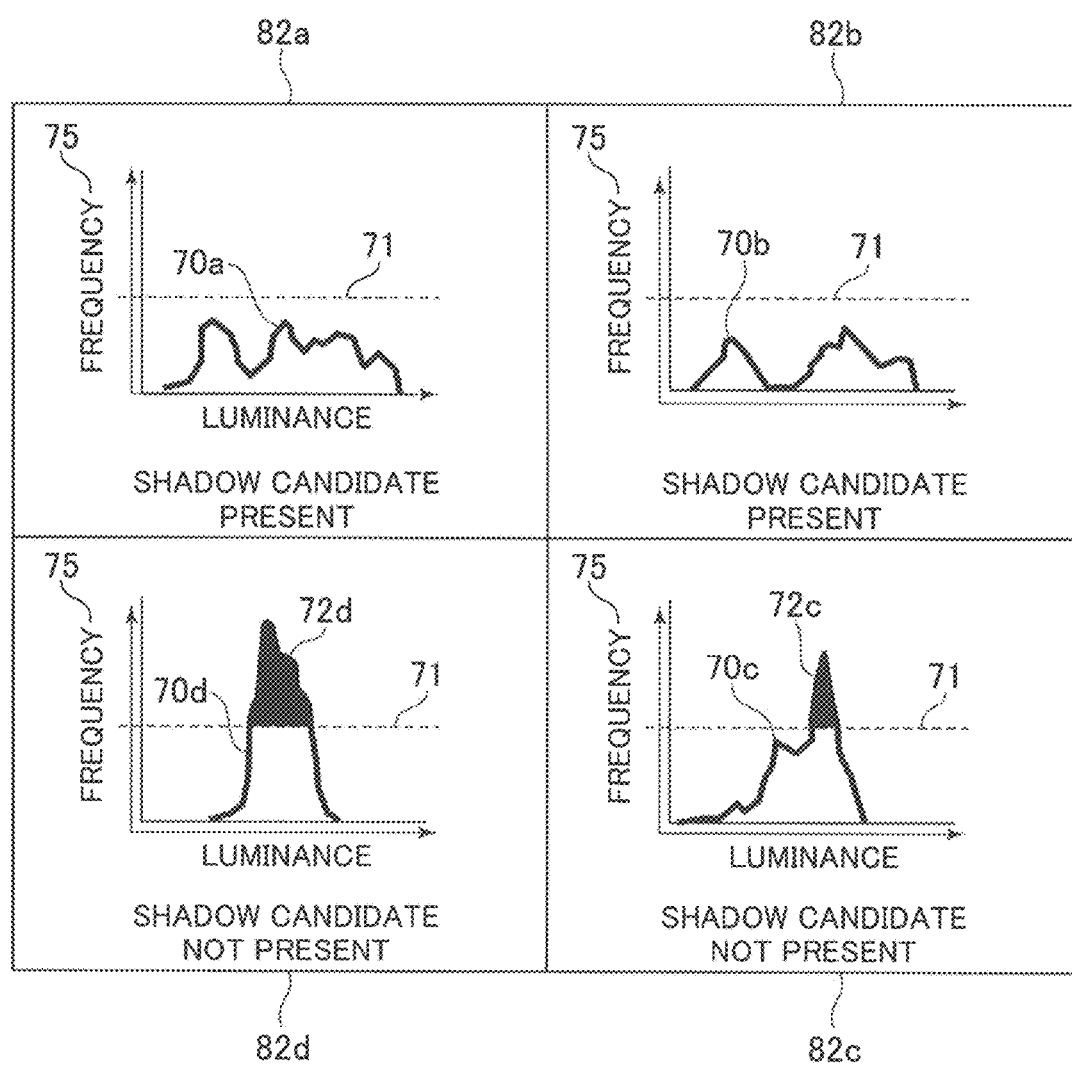
FIG. 9 is a luminance distribution diagram at step 42b in FIG. 8.

FIG. 9 is an explanatory view of a luminance distribution diagram at step 42b in FIG. 8. Referring to FIG. 9, the frequency 75 indicates the number of pixels on which a luminance is present. In the example of FIG. 9, luminance distribution diagrams 70a, 70b, 70c and 70d are created for the images 20a, 20b, 20c and 20d of the cameras 6a, 6b, 6c and 6d, respectively.

At step 42c, an area in which the luminance distribution is equal to or greater than a predetermined binarization threshold value 71 for extracting a shadow within a reference processing target region is calculated, for example, with regard to the luminance distribution diagram 70a of the input image 20a of the camera 6a. However, since no area exists in the portion in which the luminance distribution is equal to or greater than the threshold value, at step 42e, a decision that "there exists a shadow candidate" is made. Where a shadow candidate exists in this manner, since the luminance is dispersed to a luminance of the bright ground and a luminance of the dark shadow, the luminance distribution diagram 70a includes no protrusion through the binarization threshold value 71.

Further, also with regard to the luminance distribution diagram 70b of the input image 20b of the camera 6b, similarly there exists no area in the portion in which the luminance distribution is equal to or higher than the binarization threshold value 71 in the reference processing target region, and therefore, a decision that "there exists a shadow region" is made.

In contrast, in the luminance distribution diagram 70c of the input image 20c of the camera 6c, the portion 72c in which the luminance distribution is equal to or higher than the binarization threshold value 71 in the reference processing target region exists, and the area of the portion 72c is equal to or greater than the threshold value. Therefore, a decision that "there exists no own vehicle shadow" is made. Where a shadow candidate does not exist in this manner, the luminance of the ground occupies most part, and consequently, the luminance distribution diagram 70c includes a protrusion through the binarization threshold value 71.

Further, also with regard to the luminance distribution diagram 70d of the input image 20d of the camera 6d, similarly the area of portion 72d in which luminance distribution is equal to or higher than the binarization threshold value 71 in the reference processing target region is equal to or greater than the threshold value. Therefore, a decision that "there exists no own vehicle shadow" is made.

Figure 10:
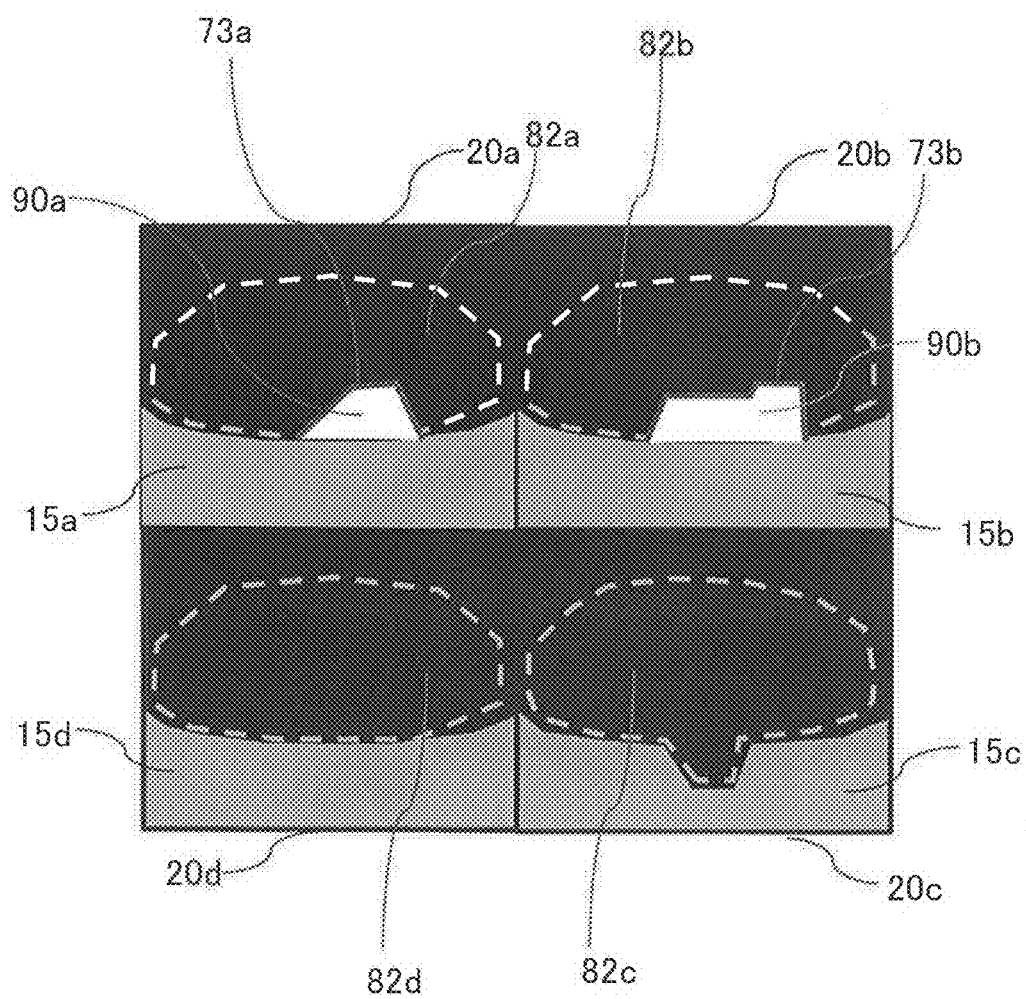
FIG. 10 is a view depicting an outline of an own vehicle shadow created by an outline image creation unit.

FIG. 10 is a view depicting an outline of the own vehicle shadow 90a and the own vehicle shadow 90b created by the outline image creation unit 44 (refer to FIG. 7). As depicted in FIG. 10, the outline image creation unit 44 determines an outer line (profile line) of a region of the own vehicle shadow 90a extracted by the series of processes of FIG. 8 as an outline 73a of the own vehicle shadow 90a. Similarly, the outline image creation unit 44 determines an outer line (profile line), of the region of the own vehicle shadow 90b as an outline 73b of the own vehicle shadow 90b. The expansion image creation unit 45 for an outline image of a shadow region performs an expansion process for an outline (shadow profile) of an outline image created by the outline image creation unit 44. The expansion process by the expansion image creation unit 45 is a process for providing a predetermined width to the outline in the outline image, and the width may be designated indirectly, for example, by designating an expansion time number. The expansion time number may be a requisite minimum number and may be one to three times.

The shadow profile image creation unit 46 determines an outline image subjected to an expansion process by the expansion image creation unit 45 as a profile image of the shadow. Consequently, where a shadow appears in the image of the image storage unit 30, a profile of the shadow is extracted by the shadow profile extraction unit 40.

Referring back to FIG. 3, the characteristic pattern extraction unit 170 extracts characteristic patterns in the images 20a, 20b, 20c and 20d on the basis of characteristic amounts in the images 20a, 20b, 20c and 20d, respectively. In the present embodiment, only a characteristic pattern in a processing target region is extracted by the function of the reference processing target region setting unit 80.

Figure 11:
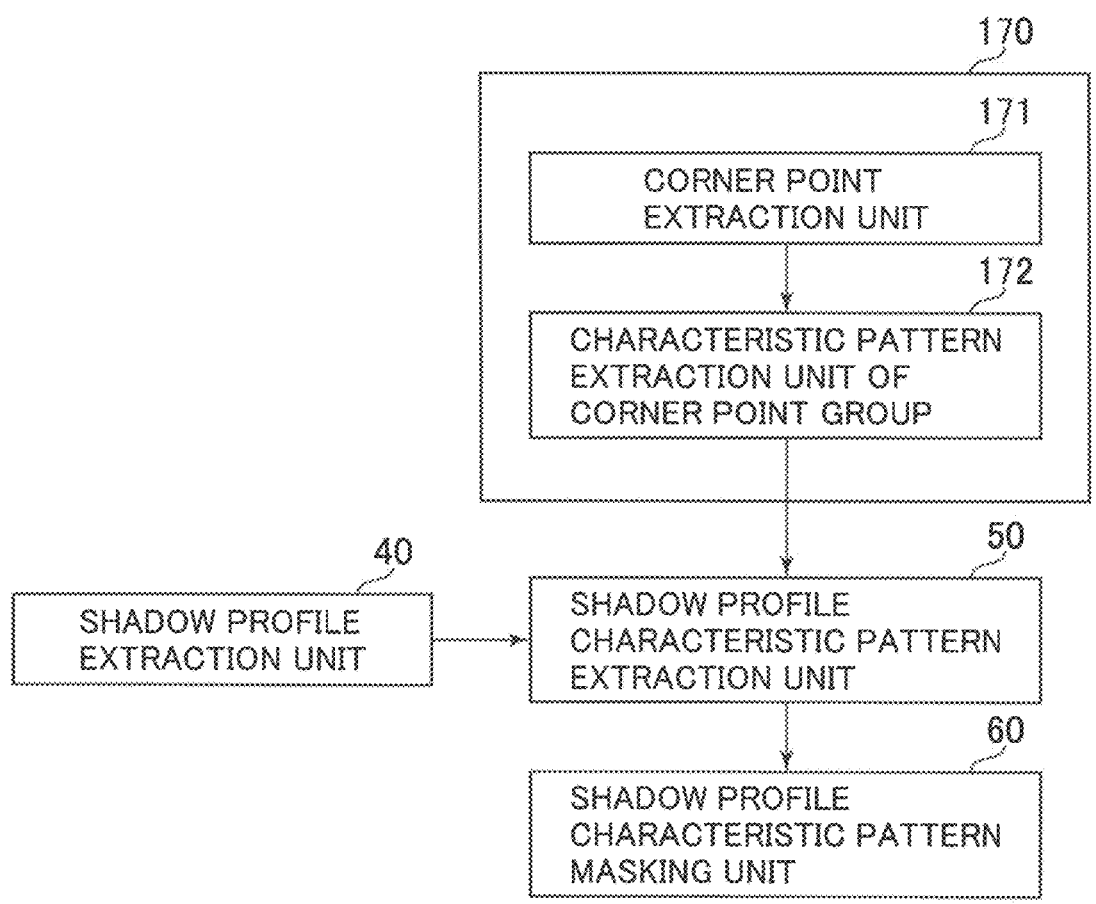
FIG. 11 is a view of elements around a characteristic pattern extraction unit and a shadow profile characteristic pattern extraction unit extracted from FIG. 3.

FIG. 11 depicts a view in which peripheral elements of the characteristic pattern extraction unit 170 and the shadow profile characteristic pattern extraction unit 50 are extracted from FIG. 3, and here, description is given taking a case in which a corner point is utilized as a characteristic pattern to be extracted by the characteristic pattern extraction unit 170 as an example. Referring to FIG. 11, the characteristic pattern extraction unit 170 functions as a corner point extraction unit 51 and a characteristic pattern extraction unit 52 of a corner point group. It is to be noted that the characteristic pattern to be extracted by the characteristic pattern extraction unit 170 may be any pattern indicating a shape of a characteristic of an image detected by extracting the characteristic on the basis of a characteristic amount. For example, a line-profile line (edge) or a region in place of or in addition to a corner point may be utilized.

Figure 12:
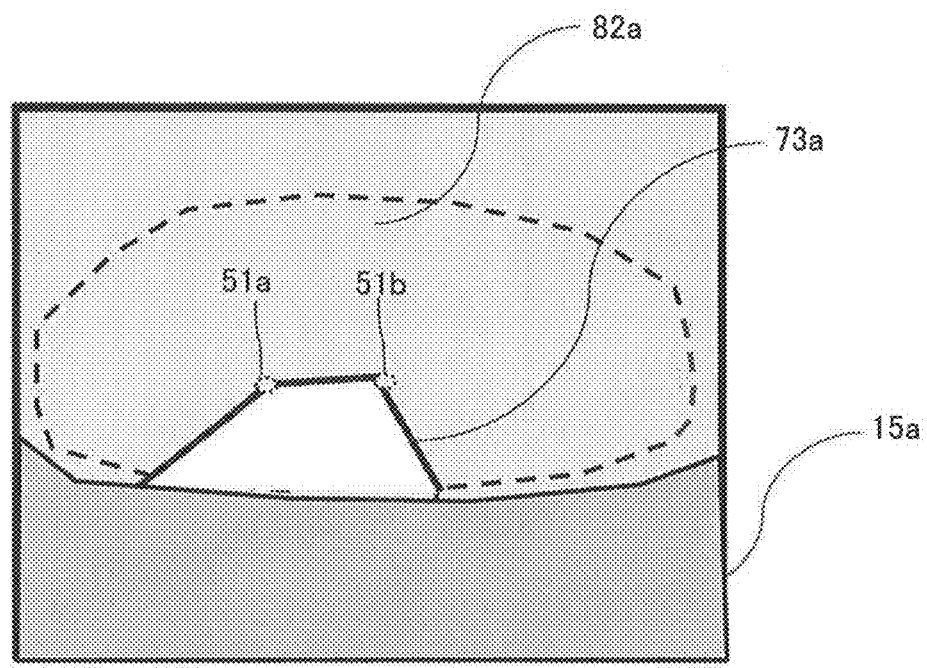
FIG. 12 is an explanatory view of processing by a corner point extraction unit and the characteristic pattern extraction unit.
Figure 13:
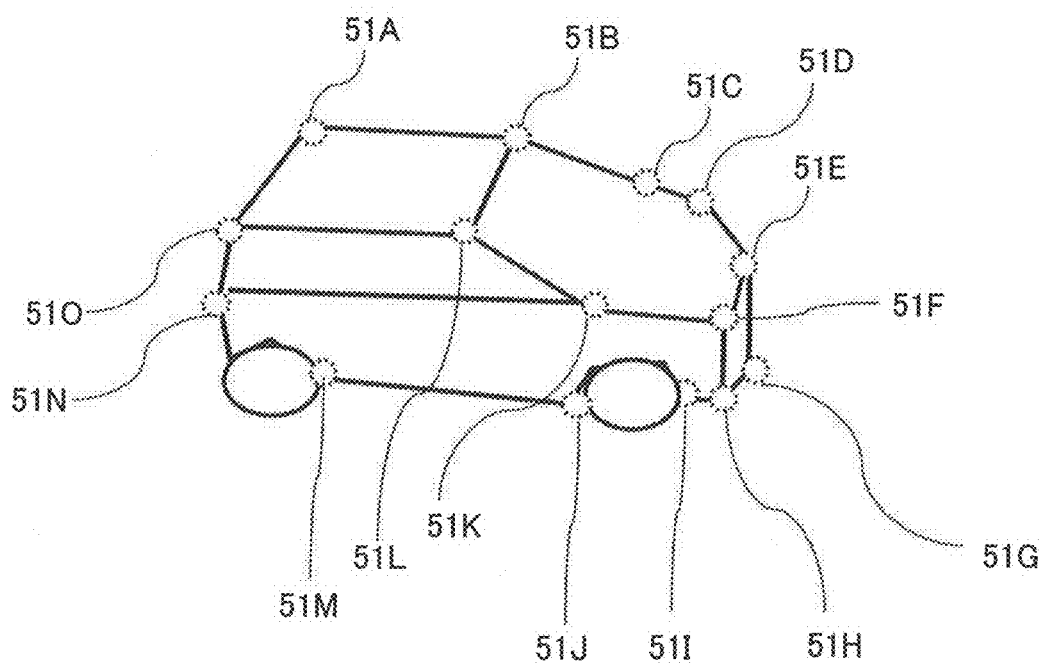
FIG. 13 is an explanatory view of processing by the corner point extraction unit and the characteristic pattern extraction unit.

The corner point extraction unit 51 extracts corner points in an image by Harris corner detection or the like. The characteristic pattern extraction unit 52 of a corner point group extracts characteristic patterns of a corner point group formed from a plurality of corner points. FIGS. 12 and 13 are explanatory views of processing by the corner point extraction unit 51 and the characteristic pattern extraction unit 52. In an example of an outline 73a of an own vehicle shadow depicted in FIG. 12, a corner point 51a and a corner point 51b (corner point group) existing at corner portions of the outline 73a are extracted as characteristic patterns. Meanwhile, in an example of a vehicle depicted in FIG. 13, since corner points exist in corners on a profile of the vehicle, a plurality of corner points 51A, 51B, 51C, 51D, 51E, 51F, 51G, 51H, 51I, 51J, 51K, 51L, 51M, 51N and 51P are extracted. In short, the corner point group 51A to 51P is generated as characteristic patterns of the vehicle.

The shadow profile characteristic pattern extraction unit 50 extracts a characteristic pattern (for example, a corner point) overlapping with a shadow profile. In particular, the shadow profile characteristic pattern extraction unit 50 extracts a characteristic pattern overlapping with a shadow profile image (image obtained by expanding an outline of a shadow) extracted by the shadow profile extraction unit 40 and determines the characteristic pattern as a shadow profile characteristic pattern. One of reasons why a corner point is used as a characteristic pattern in the present embodiment is that the number of corner points existing on a shadow has a tendency that it is relatively smaller than the number of corner points existing on a detection target object and it is easy to extract a shadow profile characteristic pattern.

Figure 14:
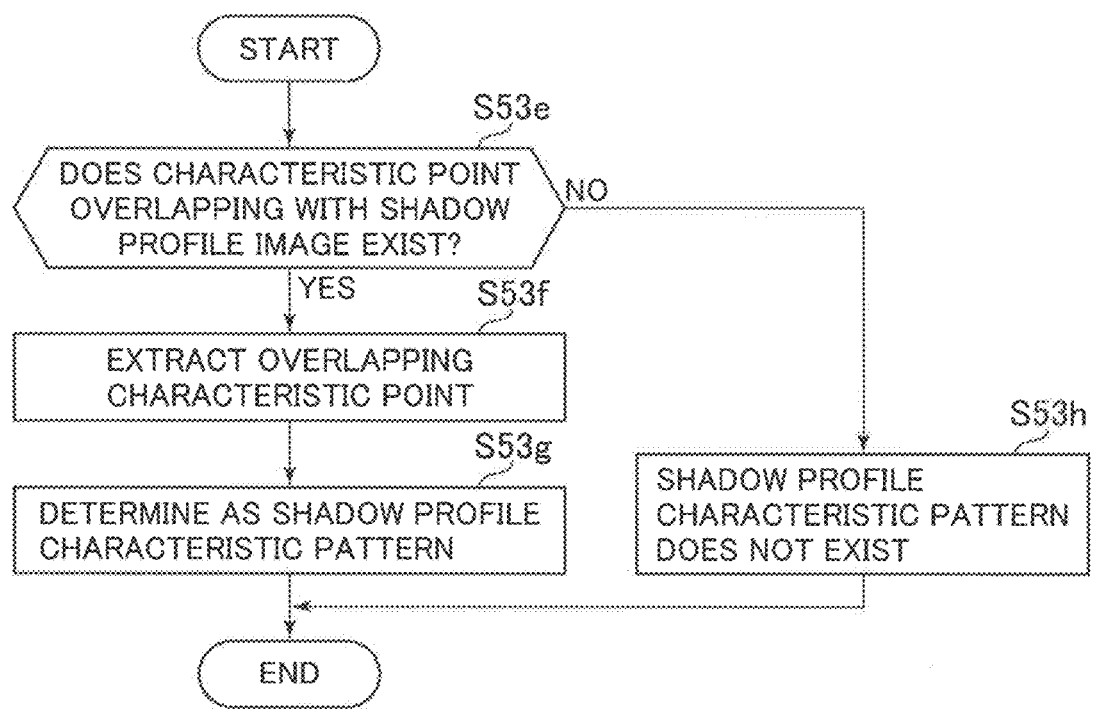
FIG. 14 is a flow chart of processing executed by the shadow profile characteristic pattern extraction unit.

FIG. 14 is a flow chart of processing executed by the shadow profile characteristic pattern extraction unit 50. First at step 53e, the shadow profile characteristic pattern extraction unit 50 decides whether there exists a characteristic pattern (corner point (characteristic point)) overlapping with a shadow profile image created by the shadow profile extraction unit 40. If it is decided at step 53e that there exists a characteristic pattern overlapping with the shadow profile, then the overlapping characteristic pattern is extracted at step 53f and determined as a shadow profile characteristic pattern (step 53g).

On the other hand, if there exists no characteristic pattern overlapping with the shadow profile at step 53e, then it is determined that there exists no shadow profile characteristic pattern (step 53h).

Figure 15:
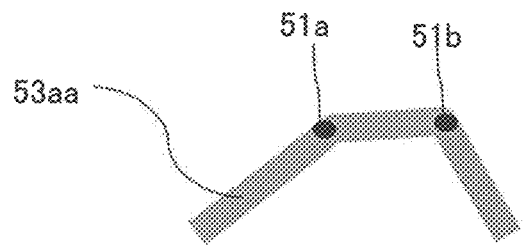
FIG. 15 is a view depicting an example of a characteristic pattern extracted at step 53f of FIG. 14.

FIG. 15 is a view depicting an example of a characteristic pattern extracted at step 53f of FIG. 14. A shadow profile image 53aa in FIG. 15 is obtained by an expansion process for the own vehicle shadow 90a. Since the corner point 51a and the corner point 51b overlap with the shadow profile image 53aa, the corner point 51a and the corner point 51b are determined as shadow profile characteristic patterns at step 53g.

Figure 16:
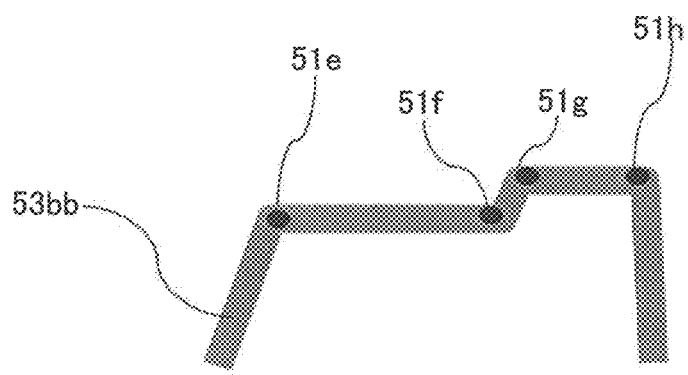
FIG. 16 is a view depicting another example of a characteristic pattern extracted at step 53f of FIG. 14.

FIG. 16 is a view depicting a different example of a characteristic pattern extracted at step 53f of FIG. 14. A shadow profile image 53bb in FIG. 16 is obtained by expansion of the own vehicle shadow 90b. A corner point 51e, a corner point 51f, a corner point 51g and a corner point 51h overlap with the shadow profile image 53bb and therefore, the corner point 51e, corner point 51f, corner point 51g and corner point 51h are determined as shadow profile characteristic patterns.

Figure 17:
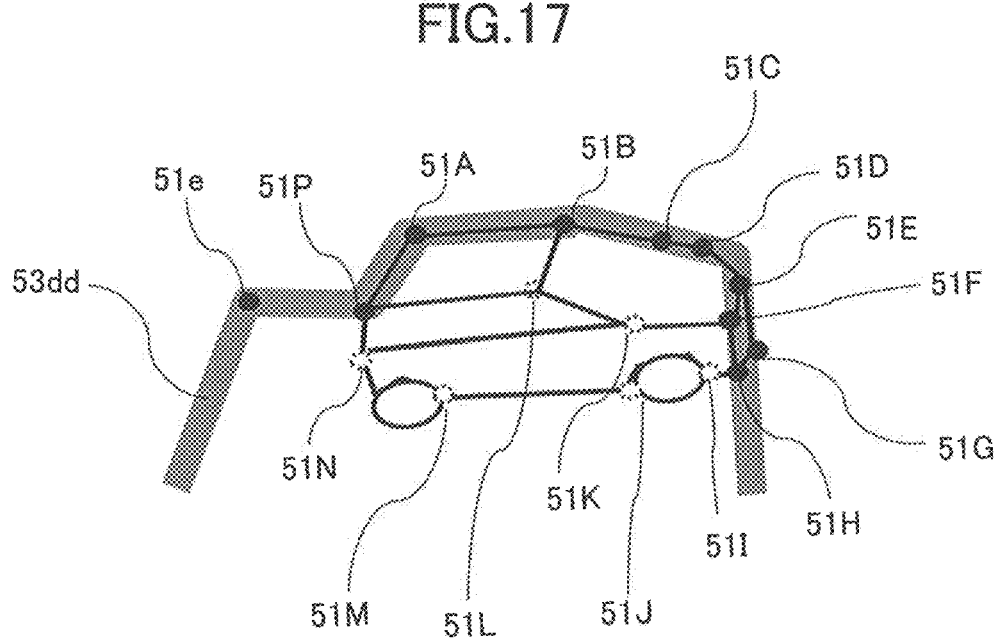
FIG. 17 is a view depicting a further example of a characteristic pattern extracted at step 53f of FIG. 14.

FIG. 17 is a view depicting a further example of a characteristic pattern extracted at step 53f of FIG. 14. In the example of FIG. 17, a case in which a black vehicle advances into the own vehicle shadow 90b is described. In the case of the black vehicle, also the vehicle is regarded as a shadow, and an outline image S53a of a shadow region created by the outline image creation unit 44 of a shadow region (refer to FIG. 7) is subjected by a preset number of times to an expansion process by the expansion image creation unit 45 (refer to FIG. 7) to create an image 53dd. Then, as corner points (characteristic patterns) overlapping with the image 53dd, corner points 51A, 51B, 51C, 51D, 51E, 51F, 51G, 51H and 51P on a profile of the vehicle are extracted in addition to the corner point 51e on the shadow profile, and they are extracted as shadow profile characteristic patterns.

The shadow profile characteristic pattern masking unit 60 creates a region in which characteristic patterns (shadow profile characteristic patterns) overlapping with a shadow profile are expanded and excludes the region (mask region) from the processing target region. Further, since the shadow profile characteristic patterns are extracted and excluded, not only misinformation of a shadow decreases, but also it becomes possible to optimize the processing region in the image process. If the mask region of the shadow profile characteristic pattern masking unit 60 is displayed on the display apparatus 100, then it becomes possible for the operator of the working machine to monitor the surroundings of the working machine without being influenced by misinformation of a shadow not only when the working machine stops but also when the working machine moves.

Figure 18:
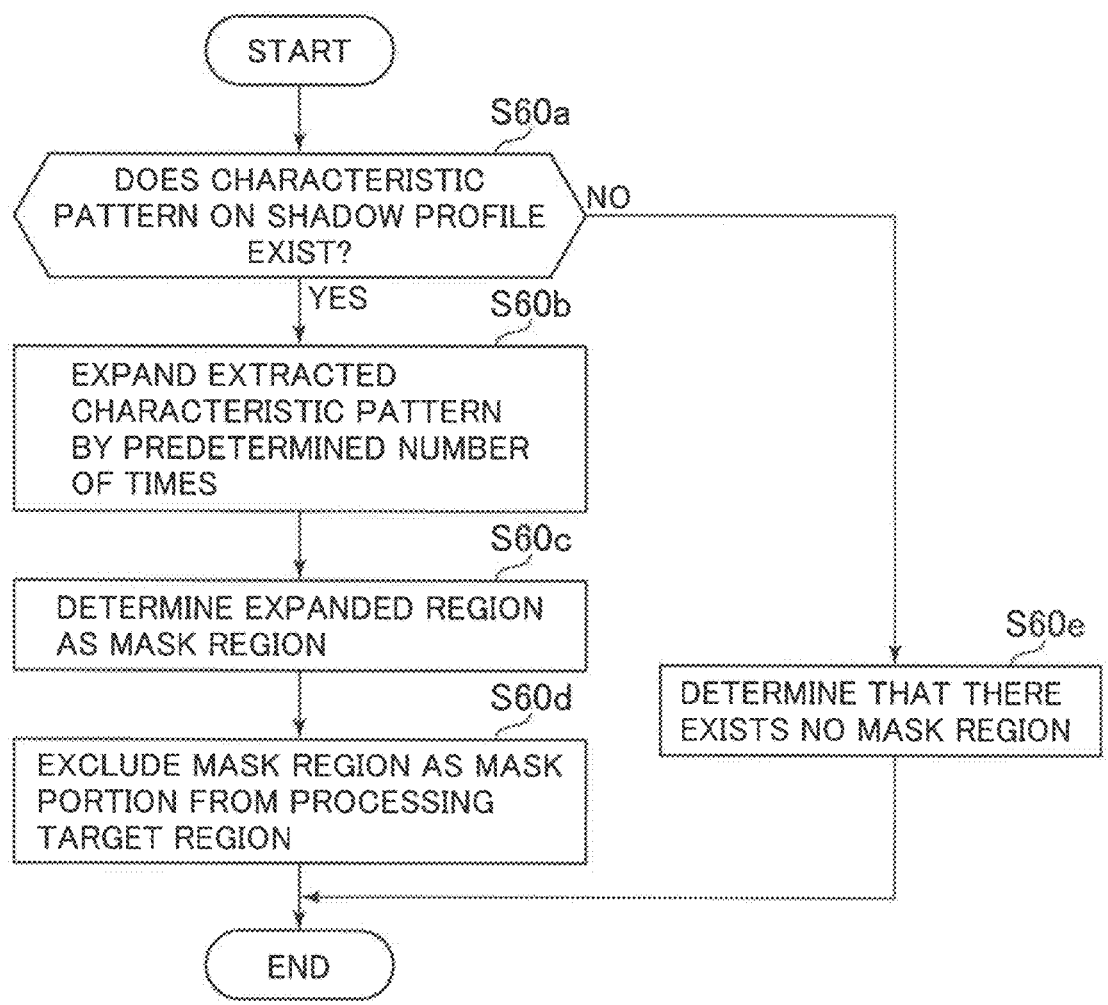
FIG. 18 is a flow chart of processing executed by a shadow profile characteristic pattern masking unit 60.

FIG. 18 is a flow chart of processing executed by the shadow profile characteristic pattern masking unit 60. First, the shadow profile characteristic pattern masking unit 60 performs, at step 60a, decision of whether there exists a characteristic pattern overlapping with a shadow profile.

If it is decided at step 60a that there exists a characteristic pattern overlapping with the shadow profile, then a process for expanding the extracted characteristic pattern by a predetermined number of times (approximately several times) is performed at step 60b. The expansion process is performed by expanding the characteristic pattern by approximately several times, and if Harris corner detection is used, a characteristic pattern is extracted by one pixel. Thus, it is sufficient that the characteristic pattern is expanded to be a mass having a diameter of approximately five to ten pixels.

Then at step 60c, the expanded region is determined as a mask region, and at step 60d, a process of excluding the mask region as a mask portion from the processing target region is performed.

On the other hand, if it is decided at step 60a that there exists no characteristic pattern overlapping with the shadow profile, then it is decided at step 60e that there exists no mask region.

Consequently, since a characteristic pattern is extracted and only a characteristic pattern region portion of a shadow profile is excluded, optimization of the processing region in the image process can be achieved.

Figure 19:
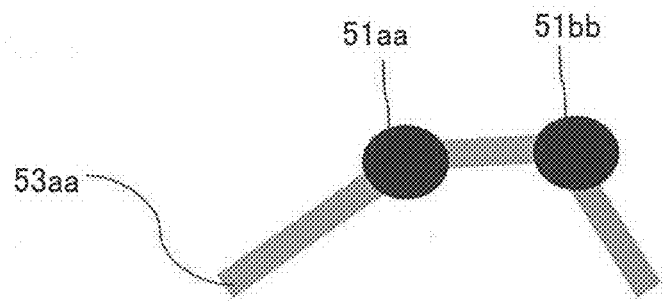
FIG. 19 is a view depicting an example of an image obtained by expanding a corner point 51a and a corner point 51b of FIG. 15 by a predetermined number of times at step 60b by the shadow profile characteristic pattern masking unit.

FIG. 19 is a view depicting an example of an image in which the corner point 51a and the corner point 51b of FIG. 15 are expanded by a predetermined number of times (approximately several times) at step 60b by the shadow profile characteristic pattern masking unit 60. If the corner point 51a and the corner point 51b that are characteristic patterns on the shadow profile are subjected to an expansion process by approximately several times in eight directions or four directions, then a point 51aa expanded from the corner point 51a is generated and a point 51bb expanded from the corner point 51b is generated. The regions 51aa and 51bb are excluded as a mask portion from the processing target region (region for which obstacle detection is to be performed by the object detection unit 180) at step 60d. With the surroundings monitoring system configured in this manner, irrespective of complexity of the shape of the own vehicle shadow, a profile of the shadow (shadow profile) is extracted at every sampling interval, and characteristic patterns (regions 51aa and 51bb) positioned on, the shadow profile are excluded from an obstacle detection target by the shadow profile characteristic pattern masking unit 60. Therefore, it can be prevented that the own vehicle shadow is recognized as an obstacle in error (misinformation of the shadow).

Figure 20:
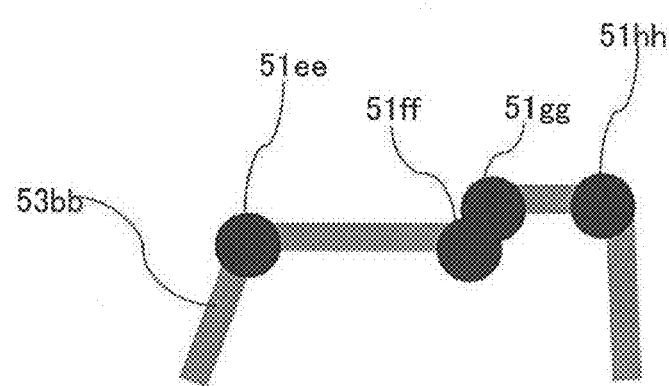
FIG. 20 is a view depicting an example of an image obtained by expanding a corner point 51e, a corner point 51f, a corner point 51g, and a corner point 51h of FIG. 16 by a predetermined number, of times at step 60b by the shadow profile characteristic pattern masking unit.

FIG. 20 is a view depicting an example of an image in which the corner point 51e, corner point 51f, corner point 51g and corner point 51h of FIG. 16 are expanded by a predetermined number of times (approximately several times) at step 60b by the shadow profile characteristic pattern masking unit 60. If an expansion process is performed by approximately several times in eight directions or four directions for the corner point 51e that is a characteristic pattern on the shadow profile, then an expanded point 51ee is created. Also corner points 51ff, 51gg and 51hh are subjected to a similar expansion process, and the corner point 51ee, 51ff, 51gg and 51hh are used as mask portions and excluded from the processing target region.

Figure 21:
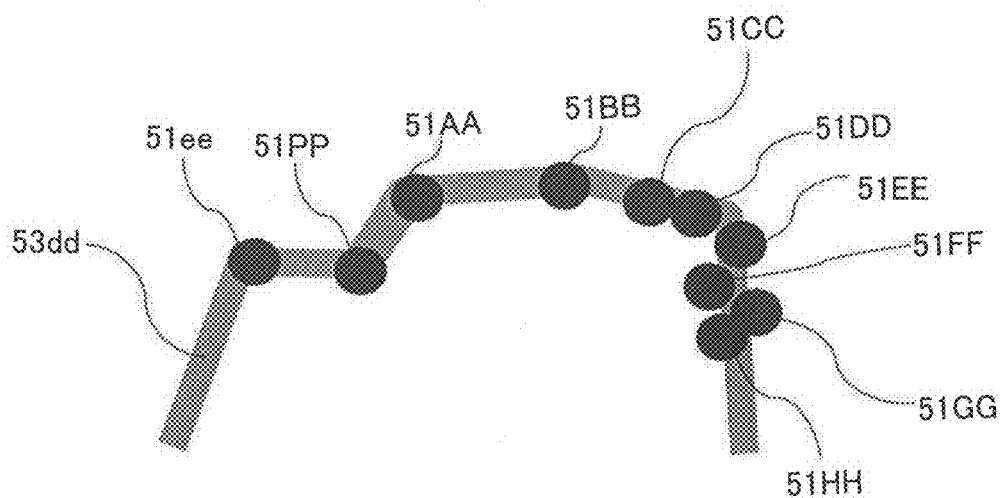
FIG. 21 is a view depicting an example of an image obtained by expanding a corner point 51e and corner points 51A, 51B, 51C, 51D, 51E, 51F, 51G, 51H and 51P of FIG. 17 by a predetermined number of times at step 60b by the shadow profile characteristic pattern masking unit.

FIG. 21 is a view depicting an example of an image in which the corner point 51e and the corner points 51A, 51B, 51C, 51D, 51E, 51F, 51G, 51H and 51P of FIG. 17 are expanded by a predetermined number of times (approximately several times) at step 60b by the shadow profile characteristic pattern masking unit 60. If the corner point 51A that is a characteristic pattern on the shadow profile is subjected to an expansion process by approximately several times in eight directions or four directions, then an expanded point 51AA is created. Also the corner point 51e and the corner points 51B, 51C, 51D, 51E, 51F, 51G, 51H and 51P are subjected to an expansion process similarly, and the corner points 51ee, 51AA and corner points 51BB, 51CC, 51DD, 51EE, 51FF, 51GG, 51HH and 51PP are excluded as mask portions from the processing target region.

Consequently, if a vehicle exists in the own vehicle shadow as depicted in FIG. 17, then the corner point 51I, corner point 51J, corner point 51K, corner point 51L, corner point 51M and corner point 51N of FIG. 17 are not determined as mask portions, they remain without being excluded from the processing target region. Accordingly, the object detection unit 180 can use the corner point 51I, corner point 51J, corner point 51K, corner point 51L, corner point 51M and corner point 51N to immediately detect an obstacle in the own vehicle shadow (in the example of FIG. 17, a vehicle). It is to be noted that it is a matter of course that the object depicted is nothing but an exemplary and also a different obstacle (for example, a person) from a vehicle can be detected similarly.

Accordingly, with the present embodiment, even if an image picked up from the surroundings of the dump truck 1 itself is complicated or has a color component, from at least one image picked up by the cameras 6, an own vehicle shadow reflected in the image can be extracted without referring to a shadow boundary pattern stored in advance as in the prior art and further without using a color component. Therefore, the occurrence of false recognition of the own vehicle shadow is reduced and the processing speed and the work efficiency are improved.

Figure 22:
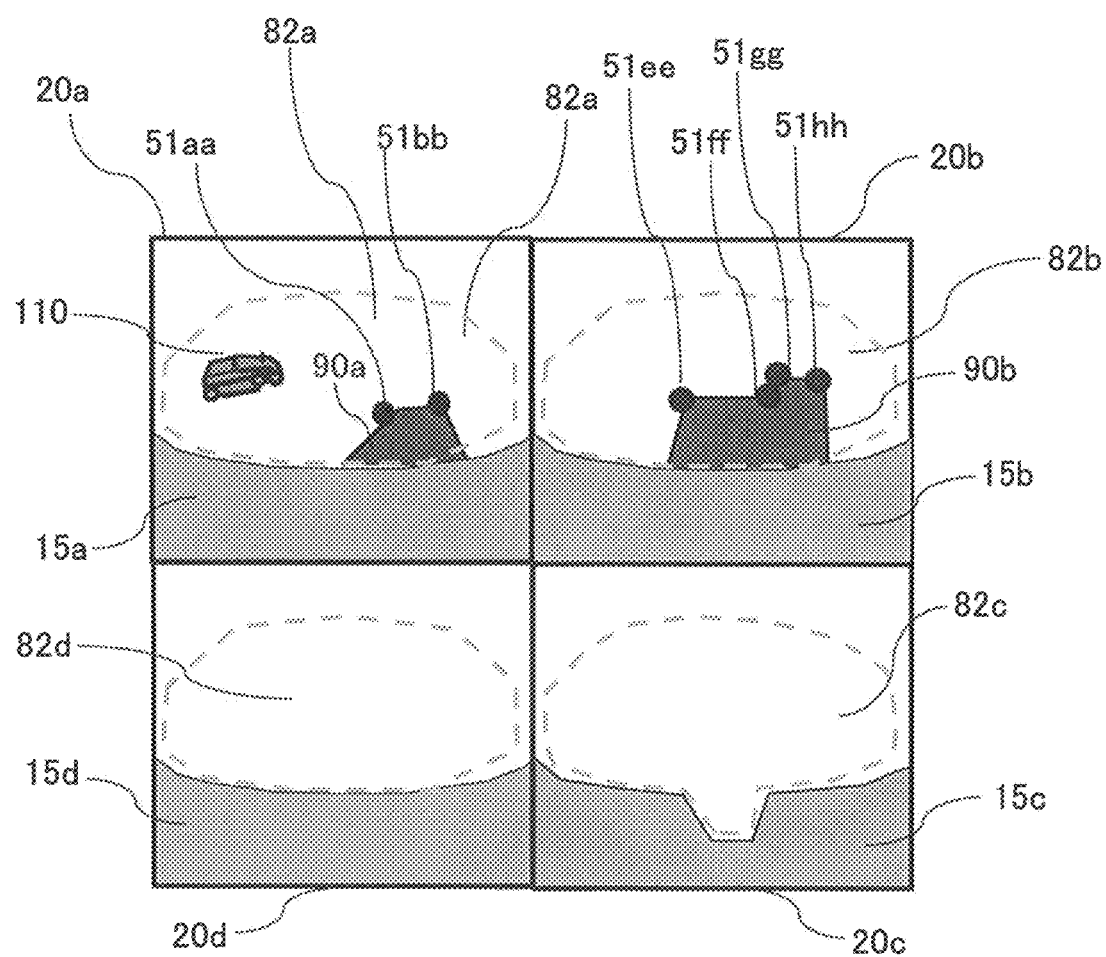
FIG. 22 is a view depicting an example of a screen in which a region, of a scene synthesized by the image synthesis unit, masked by the shadow profile characteristic pattern masking unit is displayed on a display apparatus.

FIG. 22 is a view depicting an example of a screen in which a region of a scene synthesized by the image synthesis unit 35 that is masked by the shadow profile characteristic pattern masking unit 60 is displayed on the display apparatus 100. In FIG. 22, a scene in which an input image 20a of the camera 6a, an input image 20b of the camera 6b, an input image 20c of the camera 6c and an input image 20d of the camera 6d are synthesized by the image synthesis unit 35 is displayed on the display apparatus 100. Further, the corner points 51aa and 51bb are displayed as characteristic patterns excluded from the processing target on the input image 20a, and the corner points 51ee, 51ff, 51gg and 51hh are displayed on the input image 20b. Where a region (shadow profile characteristic pattern) to be excluded from the processing target region is displayed on the display apparatus 100 in this manner, the processing target region (obstacle detection target region) from which the shadow profile characteristic pattern is excluded is obvious, and the operator can confirm the processing target region on the real time basis.

Figure 23:
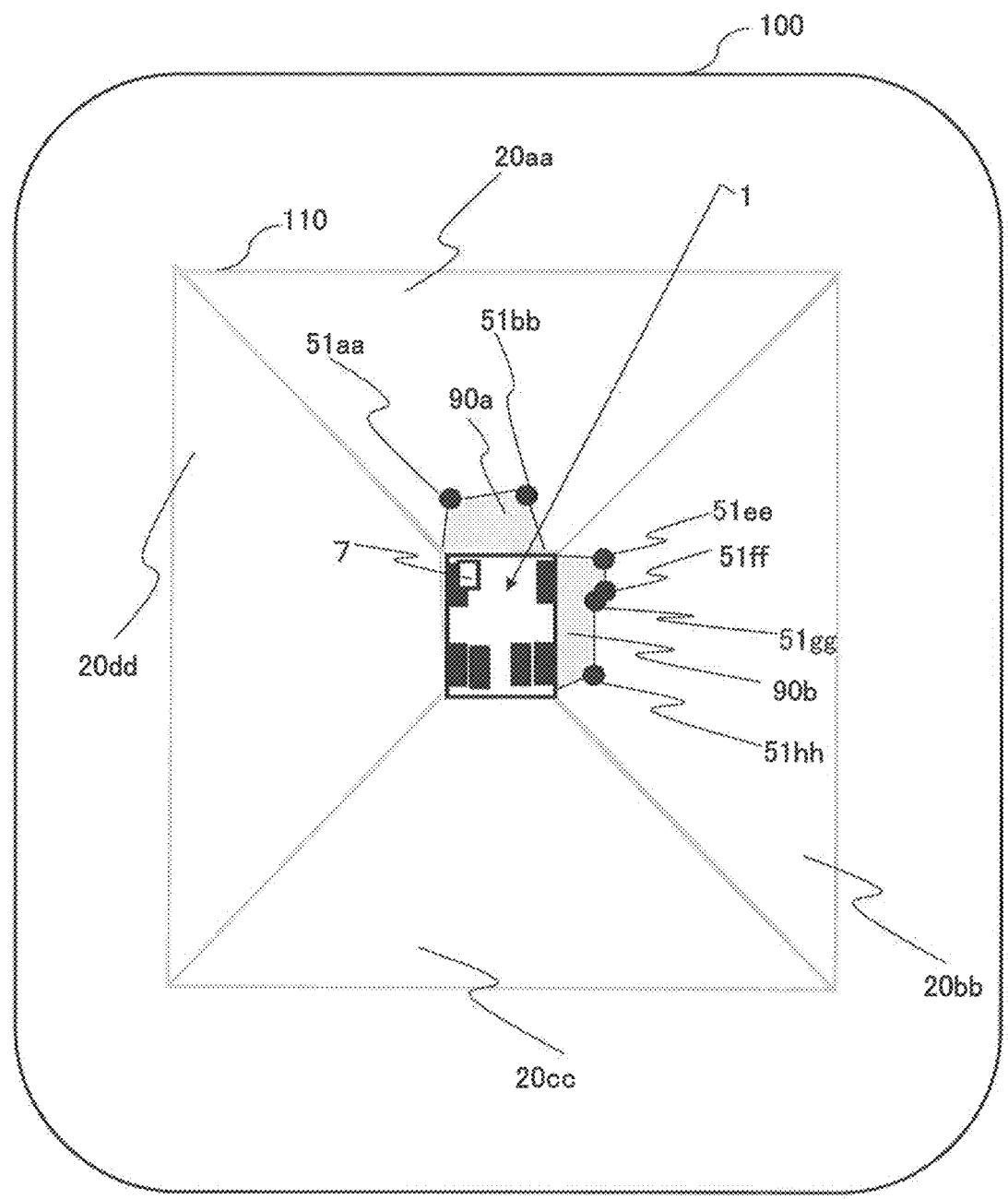
FIG. 23 is a view depicting an example of a screen in which a region masked by the shadow profile characteristic pattern masking unit is represented by a bird's-eye view image on the display apparatus.
Figure 24:
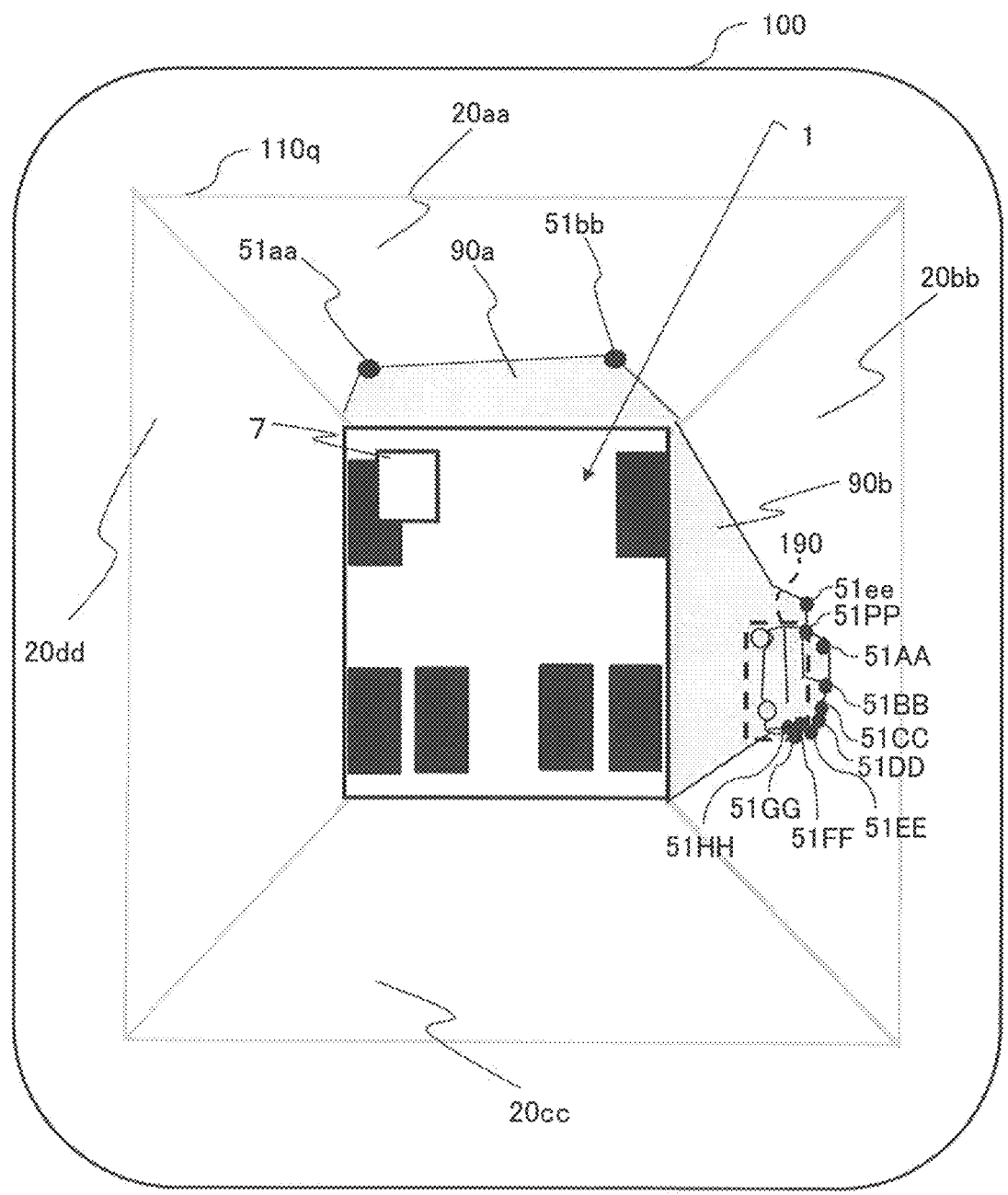
FIG. 24 is a view depicting another example of a screen in which a region masked by the shadow profile characteristic pattern masking unit is represented by a bird's-eye view image on the display apparatus.

Further, if the processing target region is displayed in a bird's-eye view around the dump truck 1 as depicted in FIGS. 23 and 24, then the operator can grasp situations on the front, rear, left and right sides in a sense of no discomfort from a sense of direction from the cab 7 and can instantly determine a region (characteristic pattern) excluded from the object detection target. Here, FIGS. 23 and 24 depict examples in which a front portion of the dump truck 1 is displayed on the upper side, and the cab 7 is displayed at a left upper position with respect to the dump truck 1.

FIG. 23 is a view depicting an example of a screen in which a region to be masked by the shadow profile characteristic pattern masking unit 60 is displayed in a bird's-eye view image 110 on the display apparatus 100. In the example of FIG. 23, the region is displayed on the display apparatus 100 so as to be spread to the display region from the surroundings of the dump truck 1 to a remote distance (approximately 12 m). In this example, a bird's-eye view image 20aa of the input image 20a, a bird's-eye view image 20bb of the input image 20b, a bird's-eye view image 20cc of the input image 20c and a bird's-eye view image 20dd of the input image 20d are processing target regions, and the corner points 51aa and 51bb to be excluded from the processing target of the bird's-eye view image 20aa are displayed and the corner points 51ee, 51ff, 51gg and 51hh to be excluded from the processing target of the bird's-eye view image 20bb are displayed. It is to be noted that a figure indicated at a central portion of the display apparatus 100 indicates the dump truck 1, and in addition to the figure, any other figure may be displayed if it indicates the dump truck 1.

FIG. 24 is a view depicting another example of a screen in which a region to be masked by the shadow profile characteristic pattern masking unit 60 is displayed in a bird's-eye view image 110 on the display apparatus 100. In the example of FIG. 24, the display region is displayed on the display apparatus 100 restricting the same to a range from the surroundings of the dump truck 1 to a comparatively short distance (approximately 5 m). In FIG. 24, a black vehicle advances in the own vehicle shadow 90b in the bird's-eye view image 20bb of the input image 6bb, and corner points 51ee, 51AA, 51BB, 51CC, 51DD, 51EE, 51FF, 51GG, 51HH to be excluded from the processing target of the bird's-eye view image 20bb are displayed. Consequently, the object detection unit 180 detects the black vehicle as an obstacle on the basis of the remaining characteristic pattern other than the black vehicle, and a warning indication 190 indicating that an obstacle is approaching the dump truck 1 is displayed on the display screen 110.

The warning indication 190 depicted is a rectangle defined so as to substantially contact with the outer shape of the characteristic pattern of the obstacle, and the operator can recognize the approach of the obstacle readily from the warning indication 190 displayed on the screen of the display apparatus 100. The shape of the warning indication 190 may be of a figure other than a rectangle, and the figure may be colored or the shape or the color of the figure may be changed as time passes. It is to be noted that, in the present embodiment, the display apparatus 100 plays a role of a notification device for the notification that an obstacle is detected by the object detection unit 180. However, as a method for obstacle notification, a sound generation device for generating sound or a warning lamp may be utilized.

Figure 25:
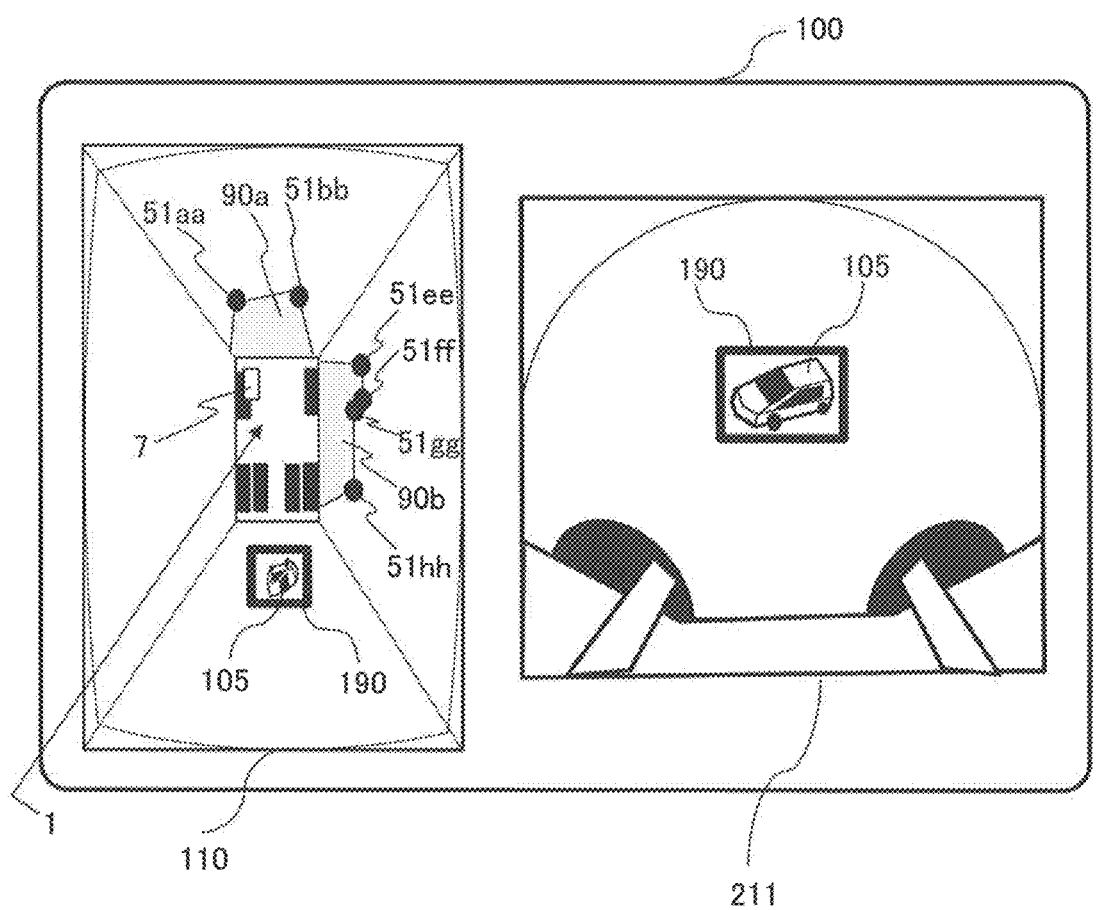
FIG. 25 is a view depicting an example of a display screen of the display apparatus.

FIG. 25 is a view depicting an example of a display screen of the display apparatus 100. The example of FIG. 25 is a view in which a bird's-eye view image 110 synthesized by the image synthesis unit 35 and an image (through image) 111 picked up by the rear camera 6c are displayed in parallel. In the bird's-eye view image 110, a front portion of the dump truck 1 is displayed on the upper side, and the cab 7 is displayed at a left upper portion of the dump truck 1. By displaying the through image 211 originating from the rear camera 6c, the operator can discriminate an obstacle in the rear (vehicle 105) without a discomfort on the basis of the camera image familiar to the operator. In the example depicted, the warning indication 190 is displayed on both of the bird's-eye view image 110 and the through image 211, and the operator can grasp approach of the vehicle 105 readily.

Figure 26:
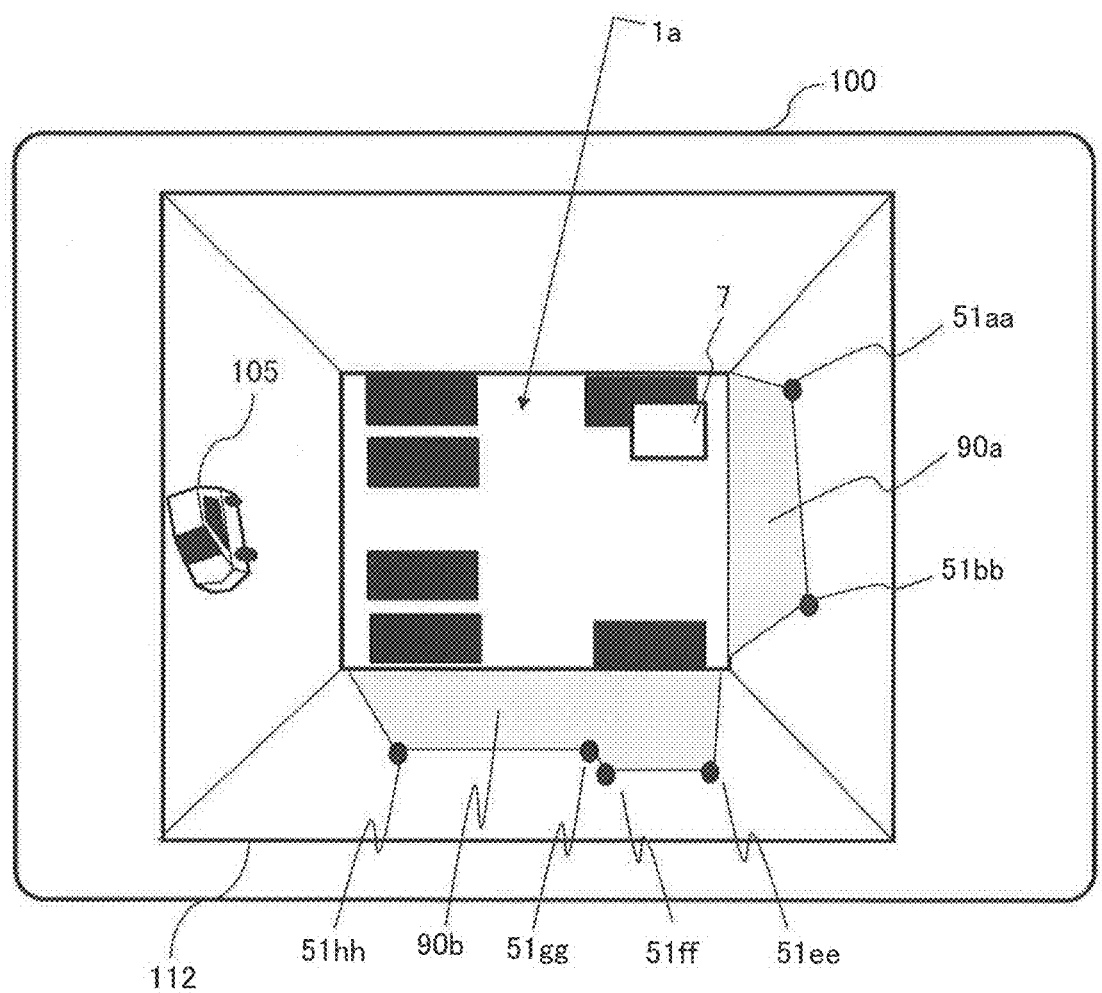
FIG. 26 is a view depicting another example of a display screen of the display apparatus.

FIG. 26 is a view depicting an example of a display screen of the display apparatus 100. In the example of FIG. 26, a range from the surroundings of the dump truck 1 to a comparatively short distance (approximately 5 m) in a bird's-eye view image 112 synthesized by the image synthesis unit 35 is displayed on the display apparatus 100. A dump track 1a indicating the dump truck 1 is displayed greater than that in the case of FIG. 25 following up the display range. A front portion of the dump track 1a is disposed on the right side in the image, and the cab 7 is displayed at a right upper portion of the display screen. Since the display range is restricted to the proximity of the dump truck 1 and an obstacle (vehicle 105) existing in the proximity of the dump truck 1 is displayed large, the operator can clearly discriminate the most dangerous obstacle existing in the proximity of the dump truck 1.

Figure 27:
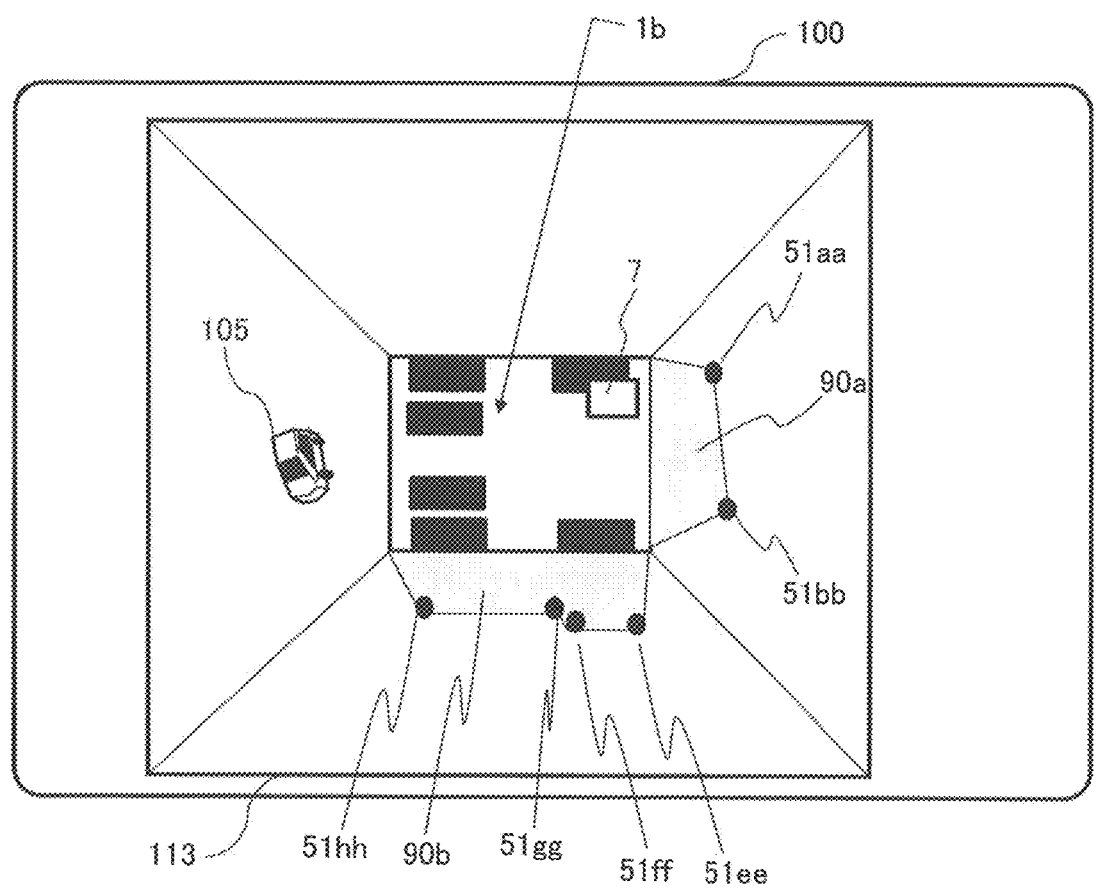
FIG. 27 is a view depicting a further example of a display screen of the display apparatus.

FIG. 27 is a view depicting an example of a display screen of the display apparatus 100. In the example of FIG. 27, a range from the surroundings of the dump truck 1 to a middle distance (approximately 8 m) in a bird's-eye view image 113 synthesized by the image synthesis unit 35 is displayed on the display apparatus 100. A FIG. 1b indicative of the dump truck 1 is displayed smaller than that in the case of FIG. 26 following up the display range. Where the display range is set to the middle distance, the operator can discriminate an obstacle (vehicle 105) existing at a position of a middle distance from the dump truck 1.

Figure 28:
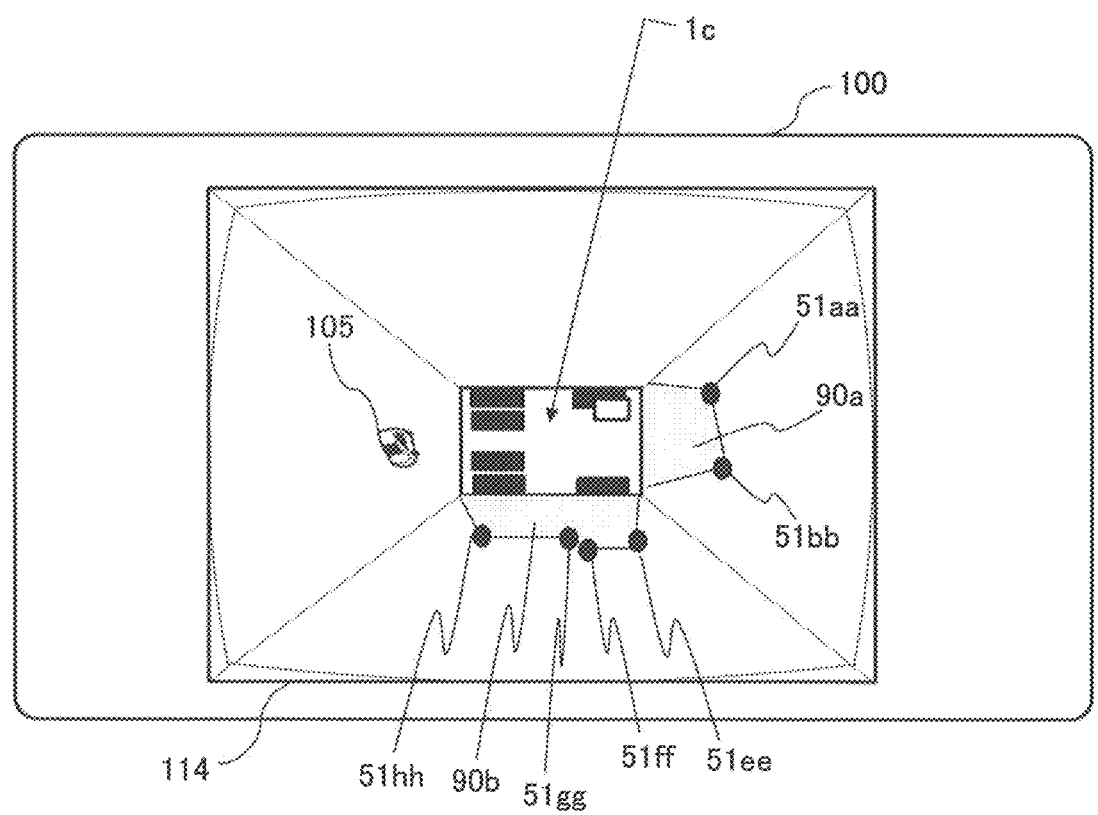
FIG. 28 is a view depicting a still further example of a display screen of the display apparatus.

FIG. 28 is a view depicting an example of a display screen of the display apparatus 100. In the example of FIG. 28, a range of a bird's-eye view image 114 synthesized by the image synthesis unit 35 from the surroundings of the dump truck 1 to a remote distance (approximately 12 m) is displayed on the display apparatus 100. A FIG. 1c indicative of the dump truck 1 is displayed in a smaller size than that in the case of FIG. 27 following up the display range. Where the display range is set to a remote distance, the operator can discriminate an obstacle (vehicle 105) existing at a position of a remote distance from the dump truck 1.

Figure 29:
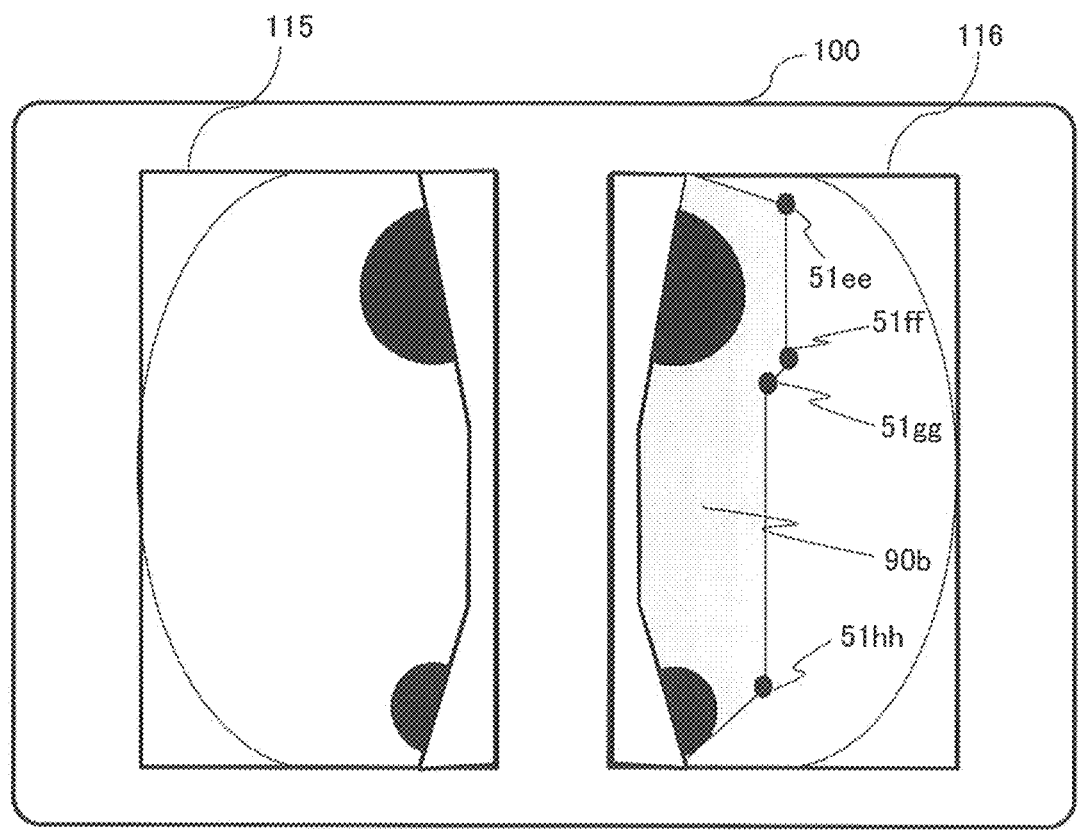
FIG. 29 is a view depicting a yet further example of a display screen of the display apparatus.

FIG. 29 is a view depicting an example of a display screen of the display apparatus 100. In the example of FIG. 29, a through image 116 of the right side camera 6b and a through image 115 of the left side camera 6d are displayed in parallel. Where the left and right through images 116 and 115 are displayed in this manner, discrimination of obstacles existing on the left and the right with respect to the dump truck 1 is facilitated, and therefore, discovery of an obstacle in such a case that the dump truck 1 turns to the left or the right is facilitated.

Figure 30:
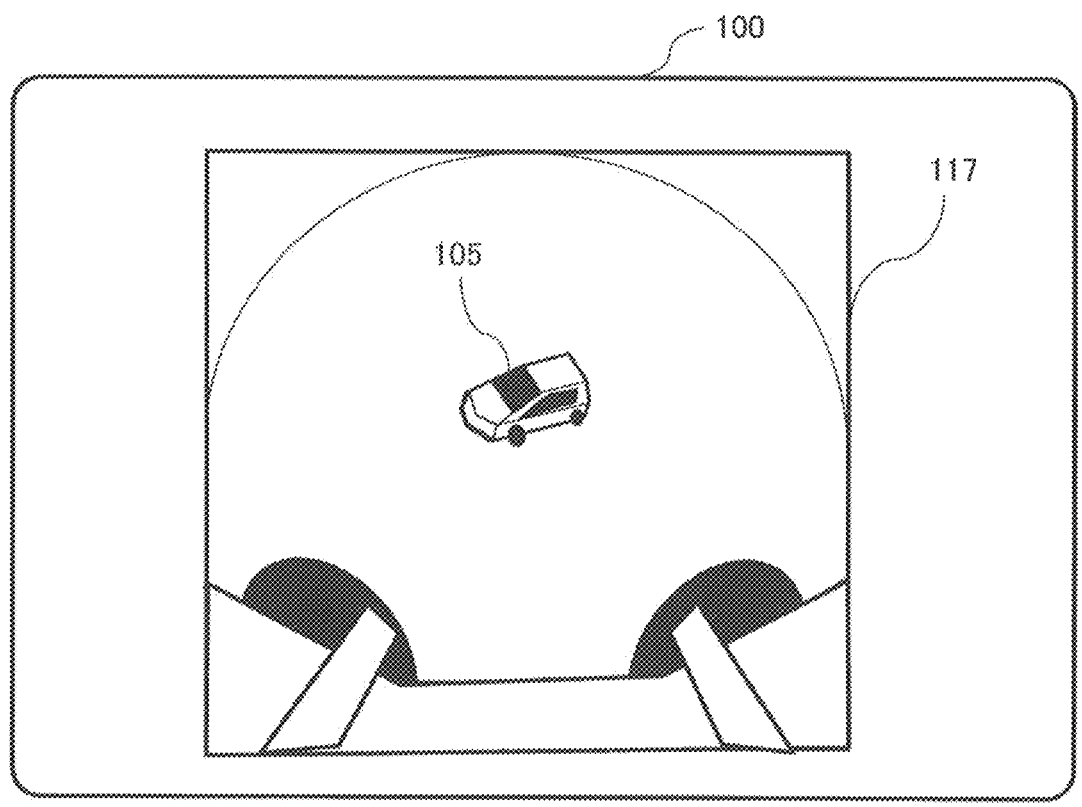
FIG. 30 is a view depicting a yet further example of a display screen of the display apparatus.

FIG. 30 is a view depicting an example of a display screen of the display apparatus 100. In the example of FIG. 30, a through image 117 of the rear camera 6c is displayed. Where the through image 117 of the rear is displayed in this manner, discovery of an obstacle that exists in the rear of the dump truck 1 and is most difficult to discover is facilitated.

Figure 31:
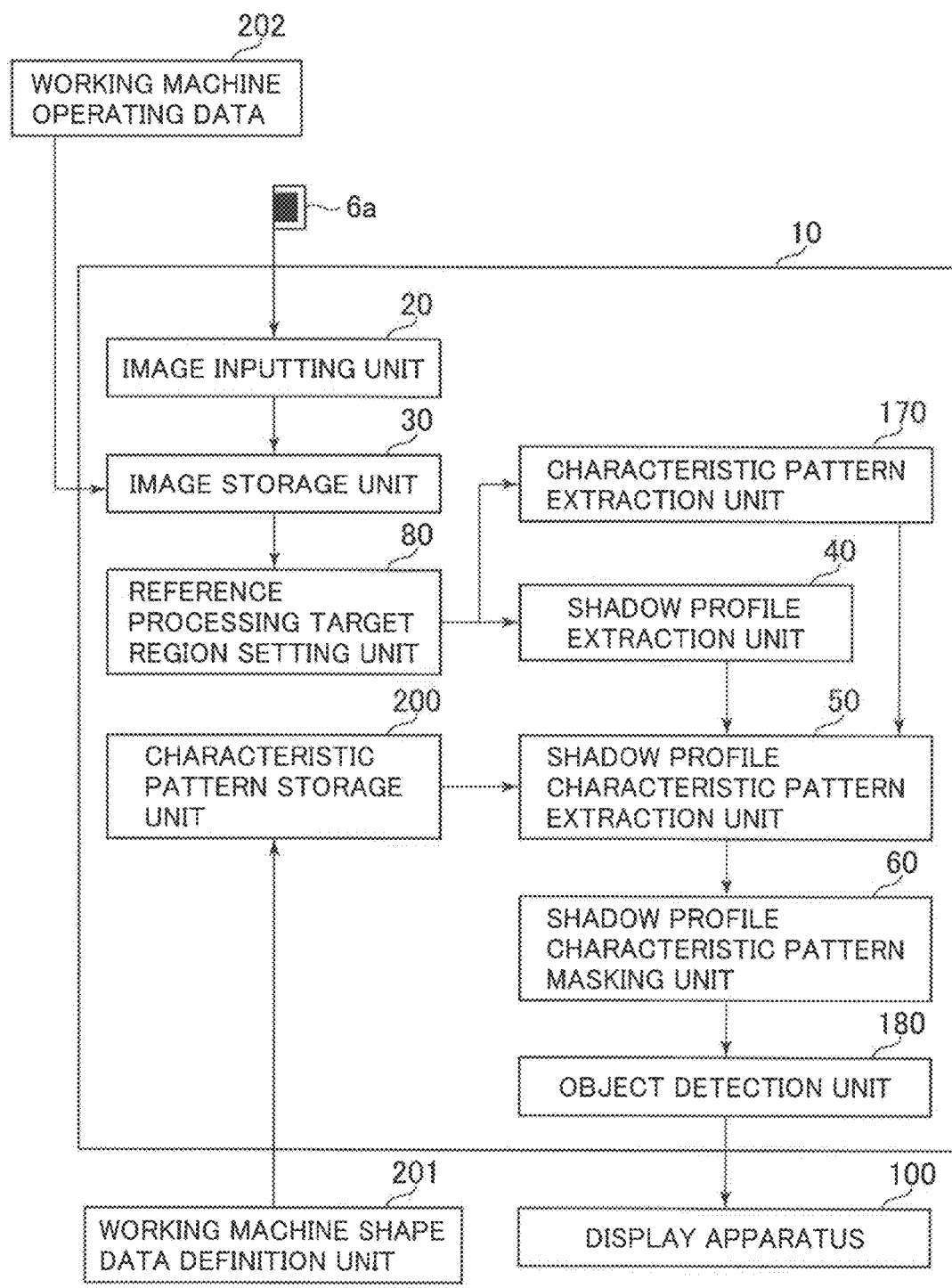
FIG. 31 is a view depicting a different example of a general configuration of a surroundings monitoring system for a working machine of the present invention.

FIG. 31 depicts a different example of a general configuration of the surroundings monitoring system for a working machine of the present invention. Like elements to those in FIG. 3 are denoted by like reference characters and overlapping description of them is omitted herein. Referring to FIG. 31, a working machine shape data definition unit 201 is an element in which shape data of the working machine is defined on the basis of specifications of the working machine. A characteristic pattern storage unit 200 extracts the shape data (appearance shape) defined by the working machine shape data definition unit 201 on the basis of the specifications of the working machine and stores the extracted shape data as a characteristic pattern indicative of the shape of the working machine. The appearance shape (shape data) here includes the total length, total width, total height, appearance uneven state and so forth of the working machine. However, the appearance shape may be information other than them if the information relates to the shape of the own vehicle shadow.

The shadow profile characteristic pattern extraction unit 50 refers to a shadow profile image obtained by the shadow profile extraction unit 40 and the shape data stored in the characteristic pattern storage unit 200 to determine a characteristic pattern overlapping with the shadow profile image as a shadow profile characteristic pattern. It is to be noted that the shadow profile characteristic pattern extraction unit 50 may otherwise perform matching between a corner point group extracted by the characteristic pattern extraction unit 170 and the shape data stored in the characteristic pattern storage unit 200 and extract, if they are similar to each other with the matching rate between them equal to or higher than a predetermined value, then the shadow profile characteristic pattern extraction unit 50 extracts the corner point group as shadow profile characteristic patterns.

Further, if an image from the image inputting unit 20 is inputted once to the image storage unit 30 upon activation of the working machine, then an operation situation of the working machine obtained on the basis of working machine running data 202 is thereafter checked. Then, if the working machine is not in a stopping state (is operating), then image is inputted from the image inputting unit 20 to the image storage unit 30. However, if the working machine is in a stopping state, inputting of an image from the image inputting unit 20 is interrupted. Consequently, an image from the image inputting unit 20 can be sampled at a sampling interval that varies in response to an operation situation of the working machine.

Consequently, an image process may be performed on the basis of a minimum required number of input images, and decrease in time can be anticipated and optimization in process can be anticipated.

It is to be noted that, where the process described above based on the working machine running data 202 by the image storage unit 30 is not performed, an image from the image inputting unit 20 may be sampled after every fixed sampling interval.

Figure 32:
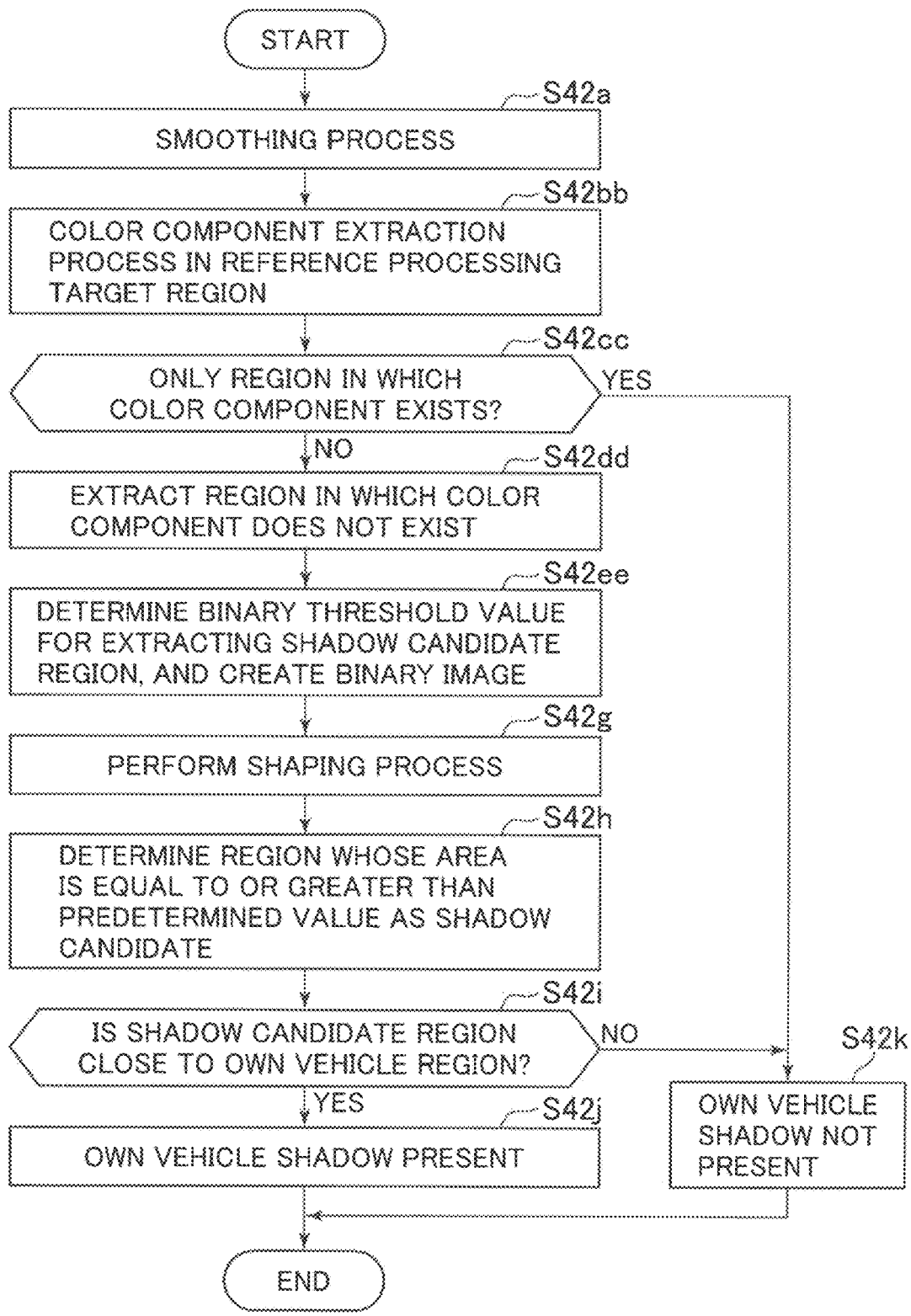
FIG. 32 is a flow chart of different processing executed by the shadow presence/absence decision unit 42 and the shadow region extraction unit 43 of the surroundings monitoring system for a working machine of the present invention.

FIG. 32 is a flow chart of different processing executed by the shadow presence/absence decision unit 42 and the shadow region extraction unit 43 according to the surroundings monitoring apparatus for a working machine of the present invention. Processes like to those in the flow chart depicted in FIG. 8 are denoted by like reference characters and overlapping description of them is omitted herein. At step 42bb in the flow chart of FIG. 32, a process for extracting a color component from within a reference processing target region of an image subjected to a smoothing process at step 42a is performed. Then at step 42cc, it is decided whether the reference processing target region is configured only from a region in which a color component exists.

If it is decided at step 42cc that there exists a region in which no color component exists, then the processing advances to step 42dd, at which the region in which there exists no color component is extracted. Then at step 42ee, a binary threshold value for extracting a shadow candidate region is determined to create a binary image, and the processes at steps beginning with step 42g are performed.

On the other hand, if it is decided at step 42cc that there exists only a region in which there exists a color component, then a process at step 42k is performed. Where it is possible to use a color component to discriminate a shadow in this manner, the accuracy in decision of a shadow can be improved.

Figure 33:
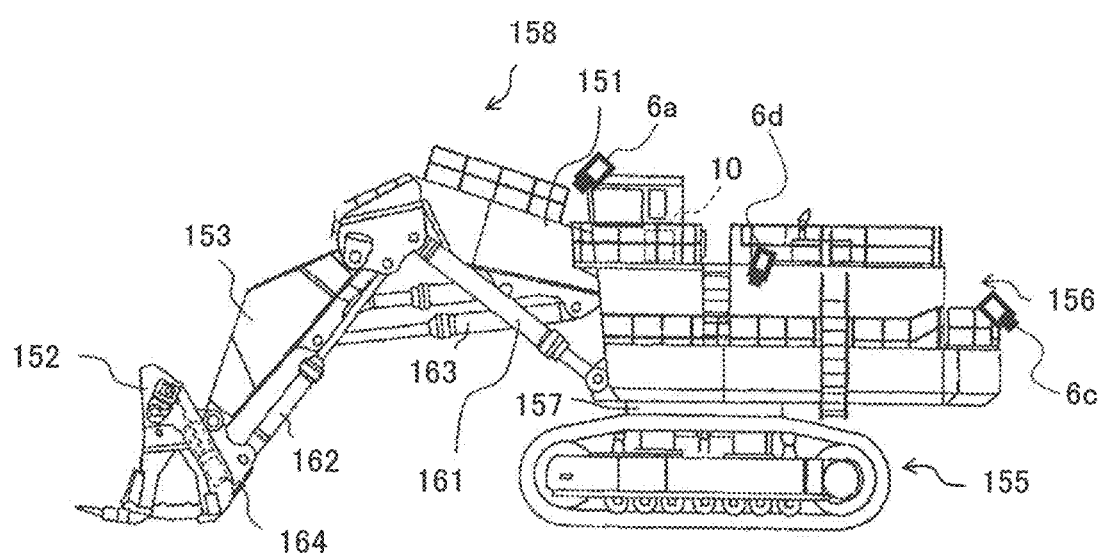
FIG. 33 is a side elevational view of a large size hydraulic excavator that is one of working machines that are a target of application of the present invention.

Incidentally, the target of application of the present invention is not limited to a dump truck as described above, and the present invention can be applied also to other working machines. FIG. 33 is a side elevational view of a large size hydraulic excavator of the loader type that is one of working machines that make a target of application of the present invention. The hydraulic excavator includes a lower travel structure 155, an upper swing structure 156 provided for swinging motor on the lower travel structure 155 through a swing structure bearing 157, and a front work implement 158 of the articulated type connected for upward and downward movement on the upper swing structure 156. A bucket 152 provided on the articulated front work implement 158 is disposed such that, in a ground contacting state, the opening thereof is directed forwardly, and a bucket opening/closing cylinder 164 is provided in such a manner as depicted in FIG. 33 on the bucket 152. Further, a boom cylinder 161, a bucket cylinder 162, an arm cylinder 163 and the bucket opening/closing cylinder 164 perform, through respective expanding and contracting movements thereof, boom raising/lowering, arm pushing/pulling, bucket clouding/dumping and bucket closing/opening. If a plurality of cameras (for example, cameras 6a, 6c and 6d) in FIG. 33) and the components described above beginning with the image processing apparatus 10 are incorporated in the hydraulic excavator configured in such a manner as described above, then a surroundings monitoring system can be configured similarly as in the case of the dump truck 1 described hereinabove.

It is to be noted that the present invention is not limited to the embodiments described above but includes various modifications without departing from the spirit and scope of the present invention. For example, the present invention is not limited to a system that includes all components described hereinabove in connection with the embodiments but includes a system from which some of the components are eliminated. Also it is possible to add or replace some of the components of a certain one of the embodiments to or with the components of a different one of the embodiments.

Further, the components of the image processing apparatus described above and the functions, execution processes and so forth of the components may be implemented partly or entirely by hardware (for example, logics for executing the functions are designed in an integrated circuit). Further, the components of the image processing apparatus described above may be a program (software) that implements, by being read out and executed by an arithmetic processing unit (for example, a CPU), the functions relating to the components of the image processing apparatus. The information relating to the program can be stored into, for example, a semiconductor memory (flash memory, SSD or the like), a magnetic storage device (hard disk drive or the like), a recording medium (magnetic disk, optical disk or the like) or the like.

DESCRIPTION OF REFERENCE CHARACTERS 6a, 6b, 6c, 6c: Camera
30: Image storage unit
35: Image synthesis unit
40: Shadow profile extraction unit
50: Shadow profile characteristic pattern extraction unit
60: Shadow profile characteristic pattern masking unit
80: Reference processing target region setting unit
100: Display apparatus
170: Characteristic pattern extraction unit
180: Object detection

The invention claimed is:
1. A surroundings monitoring system for a working machine, comprising:
  a monocular camera incorporated in the working machine and configured to pick up a camera image of the surroundings of the working machine;
  a processor programmed to detect an obstacle existing around the working machine based on the camera image; and
  a display configured to display a notification that the obstacle is detected by the processor,
  wherein the computer processor programmed to:
    extract a plurality of corner points in the camera image based on a characteristic amount of the camera image;
    create a binary image from the camera image based on a luminance distribution of the camera image;
    when an area of a darker region in the binary image is equal to or greater than a predetermined value and when the darker region contacts with the working machine in the camera image, determine the darker region as a region regarded as a shadow of the working machine;
    extract a profile of the region regarded as the shadow of the working machine in the camera image based on the characteristic amount of the camera image; and
    detect the obstacle existing around the working machine based on the remaining corner points excluding the corner points positioned on the profile from the corner points extracted in the camera image.
2. The surroundings monitoring system for a working machine according to claim 1,
  wherein the processor is further programmed to:
    create a bird's-eye view image including the working machine utilizing the camera image; and
    display the bird's-eye view image on the display.
3. The surroundings monitoring system for a working machine according to claim 1, the predetermined value is determined based on a magnitude of the working machine and a position of the sun.

* * * * *